United States Patent [19]
Holloway et al.

[11] Patent Number: 5,253,164
[45] Date of Patent: Oct. 12, 1993

[54] SYSTEM AND METHOD FOR DETECTING FRAUDULENT MEDICAL CLAIMS VIA EXAMINATION OF SERVICE CODES

[75] Inventors: Donald C. Holloway, Menlo Park, Calif.; Robert D. Hertenstein, Morton, Ill.; George A. Goldberg, Newton; Kelli A. Dugan, South Natick, both of Mass.

[73] Assignee: HPR, Inc., Boston, Mass.

[21] Appl. No.: 648,314

[22] Filed: Jan. 29, 1991

Related U.S. Application Data

[63] Continuation of Ser. No. 566,841, Aug. 14, 1990, abandoned, which is a continuation of Ser. No. 252,307, Sep. 30, 1988, abandoned.

[51] Int. Cl.$^5$ ............................................. G06F 15/21
[52] U.S. Cl. .................................... 364/406; 364/401
[58] Field of Search .................... 364/401, 406, 413.01

[56] References Cited

U.S. PATENT DOCUMENTS

| | | | |
|---|---|---|---|
| 4,658,370 | 4/1987 | Erman et al. | 364/513 |
| 4,803,641 | 2/1989 | Hardy et al. | 364/513 |
| 4,858,121 | 8/1989 | Barber et al. | 364/406 |

OTHER PUBLICATIONS

"Automated Claims Processing", Insurance Software Review, Marva J. Croaff, Autumn 1988, pp. 52, 54.
"Enhancing Accuracy and Timeliness Is Integral to the Claims Adjudication Process", Employee Benefit Plan Review, Anonymous, Dec. 1985 pp. 10–12.
"Healthstar", Health Benefits Management System, Product Description, Version 1.024.
"System validates medical fee schedules", Bests Review: Life/Health, Jun. 1987, 92.
"Expert system identifies miscoded health claims", Bests Review: Life/Health, Nov. 1990, 60.
"Claims editing software runs coding rule checks", Bests Review: Life/Health, Nov. 1990, 62.
Woolsey, C. "Employer spots inflated medical bills", Business Insurance, Jun. 25, 1990, 3.
Weitzel, J. R. et al. "A Company/University joint venture to build a knowledge-based system", MIS Quarterly, vol. 12, No. 1, Mar. 1988, 23-34.
Leary, E. "SSA applies expertise to develop expert systems". (Spotlight on AI-expert systems, Social Security Administration), Government Computer News, vol. 6, No. 17, Aug. 28, 1987, 49(3).
Beard, P. "Blue Cross develops insurance claim ES", AIWeek, vol. 6, No. 7, Apr. 1, 1989, 3.
Sullivan-Trainor, M. "Catching new clients", Computerworld, vol. 21, No. 50, Dec. 14, 1987, 95,99.
Snyeder, C. "From research to reality: the leading edge of expert systems", Insurance Software Review, vol. 12, No. 3, Autumn 1987, 22-4, 26-7, 30.
Christensen, J. "Insuring", High Technology Business, vol. 8, No. 10, Oct. 1988, 47-8.
Expert Systems in the Insurance Industry: 1987 Survey Report Update, Coopers & Lybrand, 1987.
Pallatto, J. "Expert system cures the blues". (Blue Cross develops insurance claims analysis system NERSys), PC Week, vol. 5, No. 50, Dec. 12, 1988, 35,44.

Primary Examiner—Gail O. Hayes
Attorney, Agent, or Firm—Wolf, Greenfield & Sacks

[57] ABSTRACT

An expert computer system for processing medical claims. Medical claims and associated representation are inputted into the expert computer system. The inputted claims are interpreted according to specific rules and against a predetermined database to determine whether the medical claims are appropriate.

16 Claims, 5 Drawing Sheets

SYSTEM AND METHOD FOR DETECTING FRAUDULENT MEDICAL CLAIMS VIA EXAMINATION OF SERVICE CODES

This application is a continuation of application Ser. No. 07/566,841, filed Aug. 14, 1990, now abandoned, which is a continuation of application Ser. No. 07/252,307, filed Sep. 30, 1988 now abandoned.

FIELD OF THE INVENTION

The present invention relates to expert systems as applied to the field of medical claims analysis and decision-making mechanisms for analyzing and applying payments to such medical claims.

BACKGROUND OF THE INVENTION

To date, attempts to modify fee-for-service payment of physicians have focused only on price. Evidence is accumulating that, while many errors are inadvertent, some physicians are increasing their reimbursement by targeting the other component of the equation: codes describing the procedures performed.

Declines in impatient care and physician visits over the last five years have been more than offset by the increase in prices of all providers. The net result has been an actual increase in the rate of real growth in health care expenditures in the past decade because of lower general inflation. Cost containment efforts, having so far concentrated on reducing unnecessary use, now are beginning to address price. Additionally the focus has been on hospitals more than physicians. Yet the cost of physician services, the second largest component of health care costs, was 20.1 percent of total costs in 1986, up from 18.9 percent in 1980. Physician costs climbed 11 percent in 1986, compared with 7.7 percent for all medical costs and 1.5 percent for the general economy.

In an effort to retain patients amid increased health care competition, physicians are negotiating agreements with managed care programs such as health maintenance organizations (HMOs) and preferred provider organizations (PPOs). Physicians give price concessions to these organizations through a negotiated fee schedule or a discount from historic charges. In addition, they agree to strong utilization controls to reduce unnecessary use. As a consequence, unless total patient volume increases, physicians have two primary options for maintaining their income. One is to increase dramatically their charges to fee-for-service patients whose benefit plans often pay the price that is customary in the physician community. The other is to up their charges to managed care programs by the indirect method of upcoding.

Incentives like these have driven the momentum in Washington, D.C. to reform the method of physician payment for Medicare and Medicaid. While various alternatives are being considered, such as capitation or physician diagnosis related groups (DRGs), widespread implementation of such approaches is not imminent. Instead, modifications to the fee-for-service payment system are likely in the next several years. If such reforms can maintain satisfactory levels of patient access while gaining physician support, a modified fee-for-service method may remain the major payment method.

Thus far, attempts to alter fee-for-service payment have included efforts such as: freezing Medicare physician fees for specified periods; developing a model for a Medicare resource based relative value scale to set prices for different physician services; and revising Medicaid fee schedules and Blue Shield relative value scales for physician reimbursement in Massachusetts.

These approaches address only part of the problem: establishing payment amount. A second, independent component for determining what physicians are paid is the code specifying the service provided. While true coding errors on payment claims will always occur, there also is evidence that some physicians are increasing their reimbursement by upcoding, assigning a higher paying code than a procedure merits, or by unpackaging services that were intended to be bundled into a single code. The administrative systems currently available are not adequate to detect and correct most of these errors.

Standard industry practice allows medical claims processors to enter the codes submitted on surgeon claims into a computer system. Fee screens are applied to these codes establishing the maximum amount that will be paid. Two coding methods most frequently used are the American Medical Association's "Current Procedural Terminology, Fourth Edition (CPT-4)," and the "California Relative Value Studies (CRVS)." Some claims administrators allow their claims processors to assign a code if it is absent from the claim; others return the claim to the physician's office for a code. Once entered into the claims processing systems, the code is typically edited for consistency with the age and sex of the patient, and sometimes for obvious rules in coding. After this step, if there is still a perceived problem with either the code or the fee, the claim is removed from the production process and referred for review by clinical staff. This reviewer, usually a nurse, may request the surgeon's official operative report, a required part of the hospital record, and/or call for a physician to review the claim. A payment for the claim, if approved, is established, and the claim is returned to the processor for payment. Emphasis throughout the insurance industry is on minimizing the time between when a claim is received and when it is paid, rather than on its accuracy.

While the problems detailed above are generally accepted, the concern is whether the cost of obtaining the savings will warrant the effort. The solution requires that medical judgment be applied to select the most appropriate code(s) when subtle clinical distinctions result in significant differences in payment to the medical care provider, or to decide when to request additional information from the provider. However, applying the required expert medical judgment has the potential of slowing down the processing of claims and significantly increasing the cost of doing so. At present, processing of medical claims is done on an automated basis using computer systems by relatively unskilled workers who input data, including the CPT-4 codes, into the computer and process them for payment. Usually, such an operator is unaware of whether the entity to whom the request for payment is made, such as an insurance company, should pay or not pay the claim as submitted. It is impractical for each of the operators to have a trained medical physician or technician to sit by the operator and decide whether a particular claim should be paid or not. The expense of such supervision would result in costs which would offset any savings realized by paying only the appropriate amount of the claim. Also, with a multiplicity of such medical reviewers, inconsistent results would occur. Therefore, to save expenses while maintaining productivity of the processing system, medical judgment must be incorporated in an automated data processing system which contains decision rules that can be used to automate the review of claims being processed.

In order to provide a cost effective automated data processing system for achieving the desired results in paying only appropriately coded claim amounts, expert systems or artificial intelligence software provides the vehicle for widespread distribution of an expert's decision-making guidance. An expert system in the form of a computer program is one which reasons like a human expert to solve the problems associated with appropriate coding of medical treatment for claims payments.

SUMMARY OF THE INVENTION

CodeReview, a product of HPR, Inc., the assignee of the present invention, uses expert systems techniques especially suited to representing the medical judgment required to assign appropriate codes to surgeon's claims. CodeReview prompts the user for additional information not already entered into the computer, and will either recommend appropriate code(s) or recommend pending the claims until additional information is received form the physician's office. The prompts and recommendations provided by CodeReview are based on the decision rules that physician reviewers have already used on a manual basis to solve identical problems and are consistent with informed surgical opinion.

The present invention uses a set of decision-making rules coupled to a knowledge base of facts and observations to assist the medical claims processor. There is included a knowledge base and a knowledge base interpreter which applies the knowledge base using the rules specified in the knowledge base interpreter. The process is an ongoing process which can be updated as new methods of inappropriate coding are discovered.

The present invention utilizes the CPT-4 codes in the knowledge base of the expert system, although other coding methods for classification of medical procedures such as the CRVS discussed above may be utilized as well. The knowledge base interpreter is a part of the CodeReview program and contains an association of the CPT-4 codes with the knowledge base of expert-derived decisions or rules. An example is the inclusion of one CPT-4 code procedure within another CPT-4 code procedure. As a specific and simple example of the foregoing, a physician or his or her billing company may submit a claim for payment for two procedures with appropriate CPT-4 codes for the procedures. If those two were CPT-4 numbers 49000 for Exploration of the Abdomen and 44140 for Partial Colectomy, and both procedures were performed on the same date, the program of the present invention will recommend to the claims processor that code 49000 should only be paid when it is not done as part of a code 44140 partial colectomy. Since code 44140 was performed, the claim for code 49000 should not be accepted and paid. The computer program invokes a rule which has been specified that states that if code 44140 appears with another code in a particular range, which in this example includes 49000, the second code should be rejected and only the first specified paid. The claims processor then rejects the payment code 49000, authorizes payment for code 44140, and so informs the physician or billing company, with the explanation given above. Without such a program, the claims processor usually pays both code numbers.

DESCRIPTION OF THE PREFERRED EMBODIMENT

Figure 1:
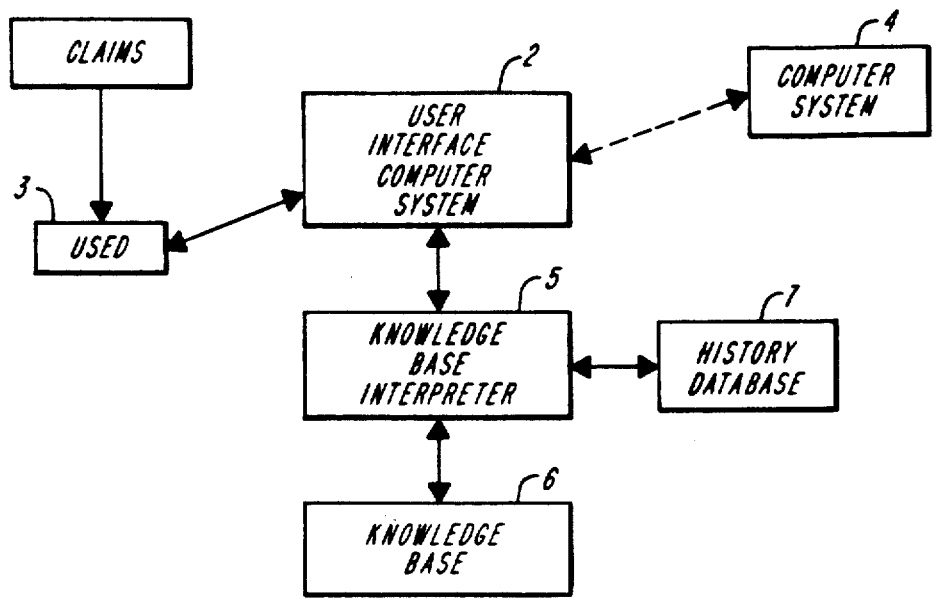
FIG. 1 is a block diagram of the system of the present invention.

Referring now to the drawings, there is shown in FIG. 1 a general block diagram of a preferred embodiment of the present invention. Claims to be processed 1 are received by the entity from whom payments are requested. A user designated at 3 enters various facts from the claims 1 into the computer system 2. Such facts include, in addition to the entries for the one or more medical procedures for which payment is sought, other data such as age of the patient, claim number, date(s) of treatment(s) and procedure(s), the name of the physician, etc. The computer system 2 may be any type of suitable computer system which can interact with the program of the present invention. One such suitable computer system is the well-known IBM "personal computer" containing sufficient data processing capabilities and memory and suitable commercially available database management software programs to perform the desired functions. Other suitable computer systems exist and are intended to come within the scope of the present invention. The system may include a connection with another computer system 4 whereby the user 3, after having used the system and methods of the present invention, communicates his or her information to the computer 4 which approves payment for the claim submitted. It is understood that the computer 4 could, in appropriate circumstances, to be described below, refuse any payment or be instructed to request further information from the entity providing the claims 1.

Generally, the user 3 will enter into the computer system 2 a description of the medical claims for which reimbursement or payment is requested or the codes associated with such claims or both. The appropriate code(s) are then sent to the knowledge base interpreter 5 for its assessment of the coded claims. The interpreter 5, using the rules of the present invention, interacts with the knowledge base 6 of the present invention and returns to the user 3 either a recommendation as to code(s) for which payment is proper or requests the user to provide further information or to obtain further information from the entity providing the claim or refers the claim to trained medical personnel for assessment. When the knowledge base interpreter has recommended approval of payment of a particular type, the user 3 then may authorize payment to the provider of the processed claim or may forward that information via input into computer system 4. A history database 7 is provided to update and refine the knowledge base interpreter 5 and the knowledge base 6 and to monitor savings associated with the recommendation.

Figure 2:
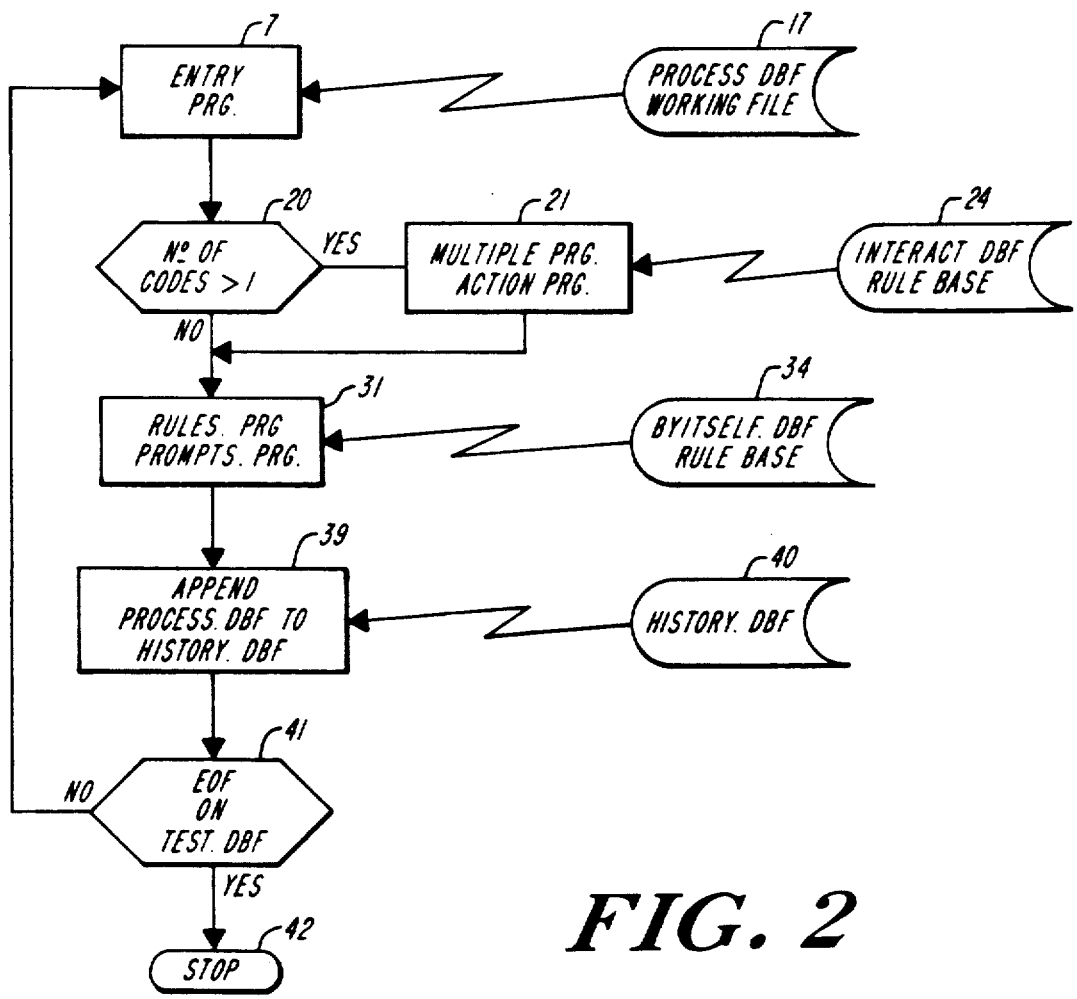
FIG. 2 is a flowchart of the overall operation of the programmed computer of the present invention.
Figure 3:
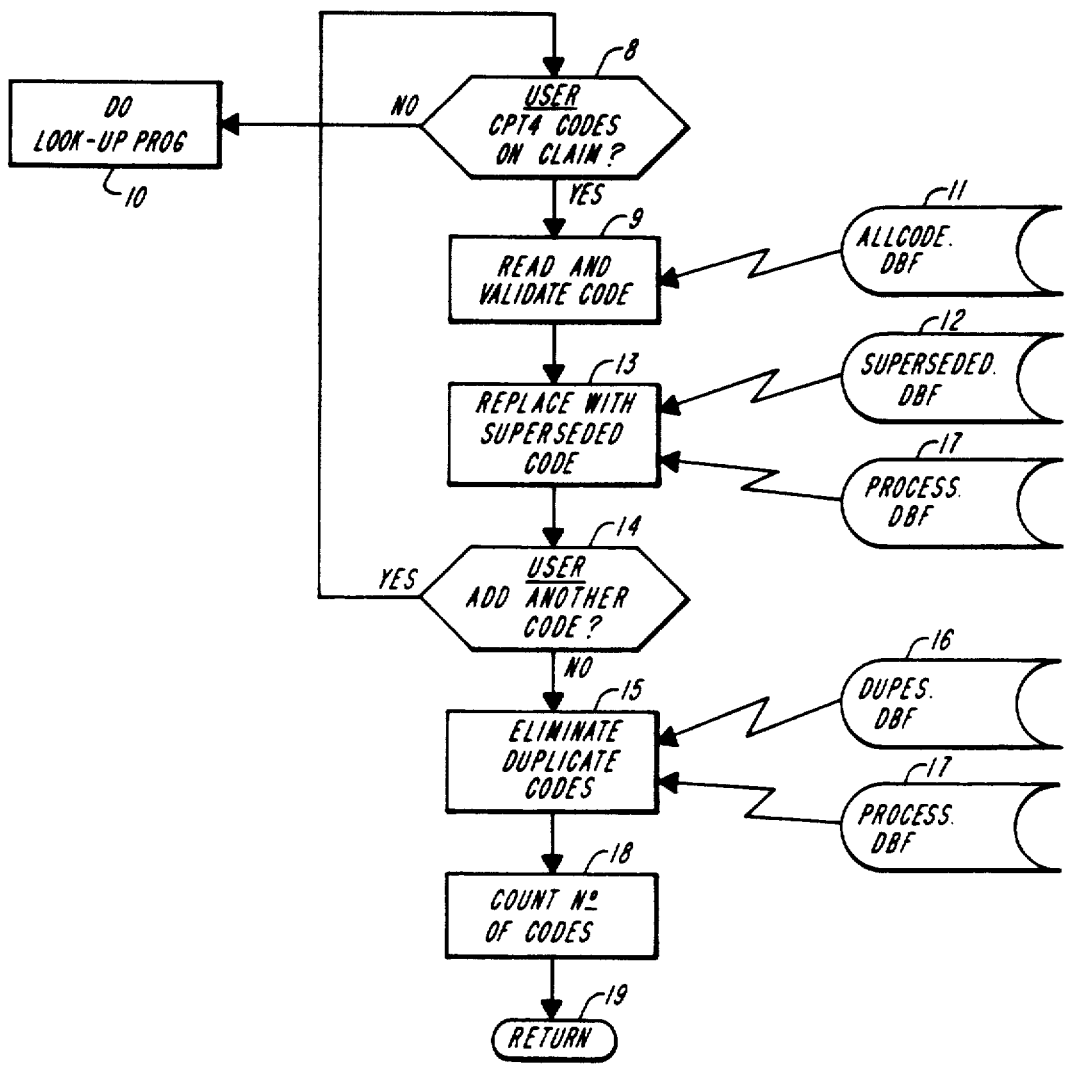
FIG. 3 is a flowchart depicting the entry program of the programmed computer of the present invention.

Referring now to FIGS. 2 and 3, the user first runs the ENTRY PROGRAM shown generally at 7 in FIG. 3. Referring now to FIG. 3, in step 8, if the CPT-4 code is given, the codes are entered into the programmed computer of the present invention and read at step 9. If the codes are or may be incorrectly given, the LOOKUP PROGRAM 10 is run, as will be explained with reference to FIG. 7. If the entity which is requesting payment has provided a code entry or entries for the treatment given, then in step 9 it is determined whether the code entry is valid or invalid by reference to the ALLCODE database 11. If an incorrect code (meaning here that there is no such alpha/numeric code or the code and description do not match) entry or entries are given or if no code entry is given at all, in step 9 the valid code entry or entries are specified by the process of the LOOKUP PROGRAM 10. By valid is meant that there is a code or codes for the treatment given a patient. It does not mean that the entry or entries are valid for payment. The ALLCODE database preferably uses the CPT-4 classification system, but other classification systems are intended to be within the scope of the present invention. The computer programmed in accordance with present invention then looks up in the SUPERSEDE database file 12 to determine whether an earlier code number has been superseded by another code entry in an updated version of the CPT-4 classification system. If the code(s) have been superseded, in step 13 the old code entry or entries are replaced by the superseded code(s) and this information is sent to the PROCESS database 17. In step 14, if another code was added in the preceding process, the program loops back to step 8 again. If not, it goes on to step 15. In step 15, any duplicate codes, if more than one code entry, are eliminated. However, in certain instances, duplicate codes are permitted, so that before eliminating the duplicate codes, a lookup in the database file 16 is performed to determine if the duplicate entries are valid. If there are no duplicate entries or or only one entry, step 15 is not performed. After step 15, the record file, as may be affected by steps 9, 10, 13, and 14, is updated and sent to the PROCESS database 17. In step 18, the number of codes resulting from the foregoing steps is counted and stored. This count will determine whether a particular program for multiple entries must be run, as will be discussed below. In step 19, the ENTRY PROGRAM 7 returns to the operations of the flowchart of FIG. 2.

Figure 4:
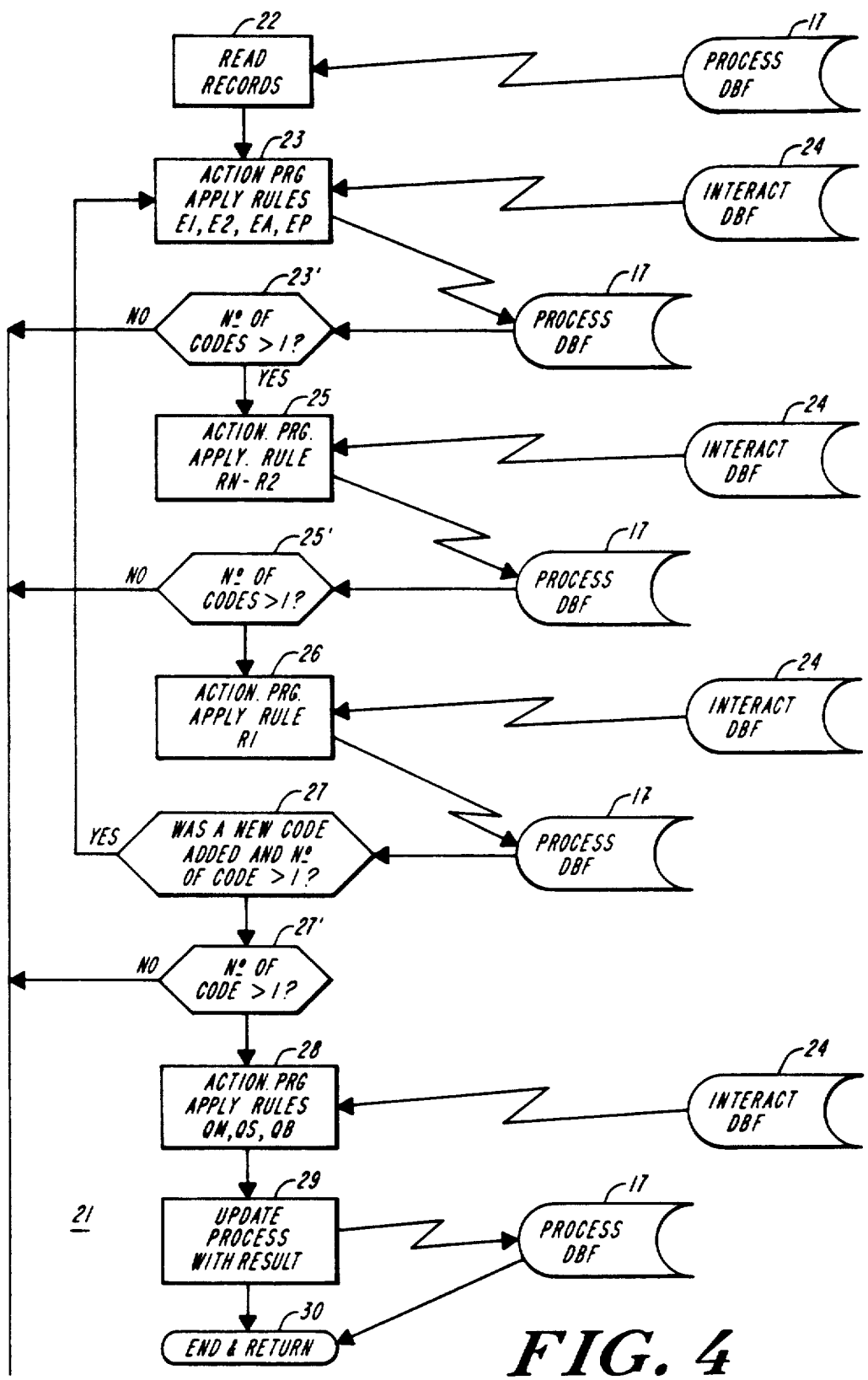
FIG. 4 is a flowchart of the operation of the programmed computer for multiple entries.

It will be recalled that in step 18 the number of codes was determined and stored. In step 20, if the number of codes determined was more than one, then the MULTIPLE PROGRAM is run in step 21, and will be presently explained. Referring now to FIG. 4, this figure is the flowchart of MULTIPLE PROGRAM 21. In step 22, the multiple number of codes under consideration is read out from PROCESS database 17. Generally, in the next series of steps, the program will examine the multiple codes presented to determine whether payment or payment authorization for each of the stated codes is medically appropriate, or whether one or more of the codes is medically inappropriate, or whether one or all of the multiple codes should be replaced by other code(s).

Figure 6:
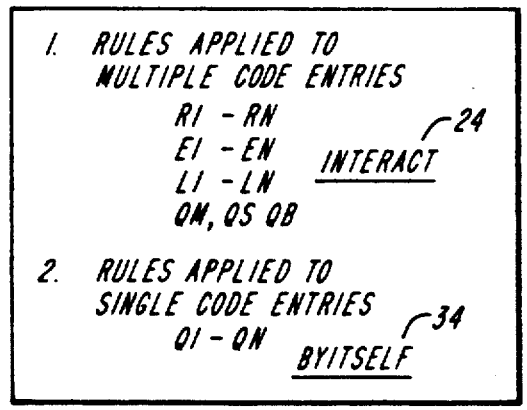
FIG. 6 is a chart of the categories of rules applied to the entries in the present invention.

In order to accomplish this, a set of rules developed for use of this program is now invoked. These rules were derived using the CPT-4 classification system, and from various medical procedures which were examined, classified, and possible combinations of procedures assessed by expert medical specialists. From this effort resulted a series of rules which can be and are applied to multiple code entries (and single code entries as well as will be discussed below). Each of the rules was developed as a result of reviewing medical procedures by expert medical personnel and is consistent with the CPT-4 classification system. However, expert medical personnel also applied clinical judgment to situations where the CPT-4 classification system is not explicit or nonexistent. Therefore, for both single and multiple code entries, a set of rules applicable to CPT-4 codes singlely and in combination are used to evaluate the appropriateness of the codes for payment. The operation of the rules is best illustrated by way of example with reference to the operation of MULTIPLE PROGRAM 21. In step 23, the codes, multiple in this case, which have been read into a file in step 22 from PROCESS database 17, are examined first by looking up from INTERACT database 24 any references to those specific multiple codes presented in step 22 to which will be applied one or more of the rules shown in summary form in FIG. 6 and more fully detailed in Appendix B. The first rules to be applied as shown in step 23, are rules referred to as E1 and E2 as shown in Appendix B. These first rules are utilized for multiple records wherein one of the codes may be eliminated for payment approval purposes. Thus, in rule E1, if one code number, here designated as ACODE, appears in the same list of codes as one or more codes in the range of BCODE to CCODE, then ACODE is eliminated and the code number appearing within the range of BCODE to CCODE is retained. It is this latter code number which will be further processed and perhaps approved for payment. Similarly, in the code E2, if code ACODE appears with another code in the range of BCODE to CCODE, ACODE is retained and the code within the range of BCODE to CCODE deleted. By first applying rules designated as E1 and E2, it may be possible to eliminate one or more inappropriate codes from consideration. Of course, the codes are not ACODE, BCODE or CCODE but actual code numbers from the CPT-4. In operation, when code numbers are entered into the computer programmed in accordance with the present invention, the program will perform a lookup of the code numbers ACODE and XCODE. The INTERACT database 24 in the program contains a reference that states Chat when ACODE is used with XCODE, and because XCODE is within the bounds of BCODE to CCODE, only one code can survive, in accordance with the E1 and E2 rules. By way of example, consider example 1 of Appendix A. That example implements rule E1. In example 1, code numbers 64450 and 10120 are entered in step 22 of FIG. 4. It is assumed that the date of treatment is the same for all code entries unless specified and entered otherwise. If so, after a lookup in the INTERACT database 24, which contains information relating to the appearance together of 64450 and 10120, the latter appearing in a range of codes analogous to the BCODE to CCODE example given above, by the E1 rule the program is instructed to recommend elimination for 64450, with an explanation given if desired and as contained in such example 1. Of course, many examples of the operation of the E1 and E2 rules are possible depending on the codes which are analyzed. Two additional "E" rules may be exercised over the INTERACT database 24. These are rules EP and EA. In rule EP, a code may be eliminated if the place of service is considered improper or unpractical. An example of this rule EP is given as example 17 of Appendix A. Rule EA is designed to eliminate a code where the age of the patient recommends exclusion of one of the codes. An example of the application of this rule is given as example 18 of Appendix A. Appendix A contains other examples of application of the rules.

After step 23, the results are sent to update PROCESS database 17. Then, in step 23', if there is only one code number remaining after step 23, the program exits to the RULES program of FIG. 5. This is because the "R" and the QM, QS and QB rules apply only to multiple entries. After step 231, in steps 25 and 26, rules designated as R2 and R1 are run, as will be explained below. The "R" rules of the present invention, as shown in Appendix B, generally replace the codes presented in step 22 with other code(s) not designated in the step 22. Rule R2, for example, provides that if a code ACODE appears with BCODE, both codes are deleted and replaced by CCODE. Rule R3 is similar to R2 except that more than two code entries are considered, here ACODE, BCODE, and CCODE, which are replaced by DCODE. Thus, the R1 rule means replace one code by another code; R2 means replace two codes by another single code, and R3 means replace three codes by another single code. Other "R" codes could be developed along the same line: RN would mean replacing N codes with one other code. As shown in FIG. 4, the RN-R2 rules are applied first before rule R1 is applied to the codes. Specific example of rules R2 and R1 are given in examples 2 and 3, respectively, in Appendix A. It must be understood that it is not required that each of steps 23, 25 and 26 will affect the code numbers processed, but these steps are used if expert medical judgment indicates they are required to arrive at appropriate codes.

Describing in greater detail the application of the R2 and R1 rules, step 25 is first seen after having accessed INTERACT database 24. The results of application of the R2 rule are sent to PROCESS database 17. Once again in step 25', the program queries from PROCESS database 17 whether there remain multiple entries. If negative, the program is exited from as explained above. In step 26, rule R1 is exercised and the INTERACT database 24 consulted and compared. The result is sent to the PROCESS database 17. It is to be understood that the R3 rule may be implemented for three codes. An example of the R3 rule is given in Example 4 of Appendix A. In step 27, after consulting PROCESS database 17 and determining whether a new code was added in the application of the R2 and the R1 rules and the number of codes is greater than one, the program loops back to step 23 to exercise the application of rules R2 and R1, E2 and E1, EP and EA on the newly-resulting (after step 26) codes. After step 27, in step 27' the program queries whether the remaining codes exceed one code. If not, the program exits as explained above. If, however, there remains more than one code resulting from the operations of steps 23, 25 and 26, then the program enters a new ACTION PROGRAM to apply rules QM, QS and QB, as shown in step 28. The "Q" set of rules are designed to alert the user 3 that a problem exists in the context of the codes presented for payment of that the particular syntax of the codes presented to the computer programmed in accordance with the present invention are such that they cannot be effectively dealt with by the programmed computer, and thus must be referred to a human consultant. Rule QM states that when ACODE appears with another code in the range of BCODE to CCODE, there is a question about this combination of codes. The user 3 might be instructed to review the claim and codes submitted, be asked to verify the dates(s) of treatment, or refer the matter to a human expert. An example of the QM code being utilized is set forth as example 5 of Appendix A. The code designated QS states that if code ACODE appears with another code in the range of BCODE to CCODE, then there is a question about ACODE. An example of this is given in example 6 in Appendix A. Finally, rule QB is applied to the codes presented. If ACODE appears with another code in the range of BCODE to CCODE, then there is a question about the code in the BCODE to CCODE range. The foregoing example given would apply to this code as well.

After all three "Q" codes have been run on the codes presented in step 28, having accessed the INTERACT database 24, the next step 29 is implemented wherein the PROCESS database 17 is updated with the information from the process of FIG. 4, and the program returned in step 30 to FIG. 2 and step 31. While rules Q, M, QS or QB may raise a question about a code, it will not cause interruption of the program, but will be reserved for later consideration by user 3.

Just prior to implementing the portion of the programmed computer given as step 31, the programmed computer up until this time has performed two operations, the first being the validation of the codes input by user 3, and the second being the application of certain expert rules to multiple code entries. The resulting codes which will be presented to the portion of the programmed computer in step 31 will either be a single or a multiple (due to looping through step 21) code.

Figure 5:
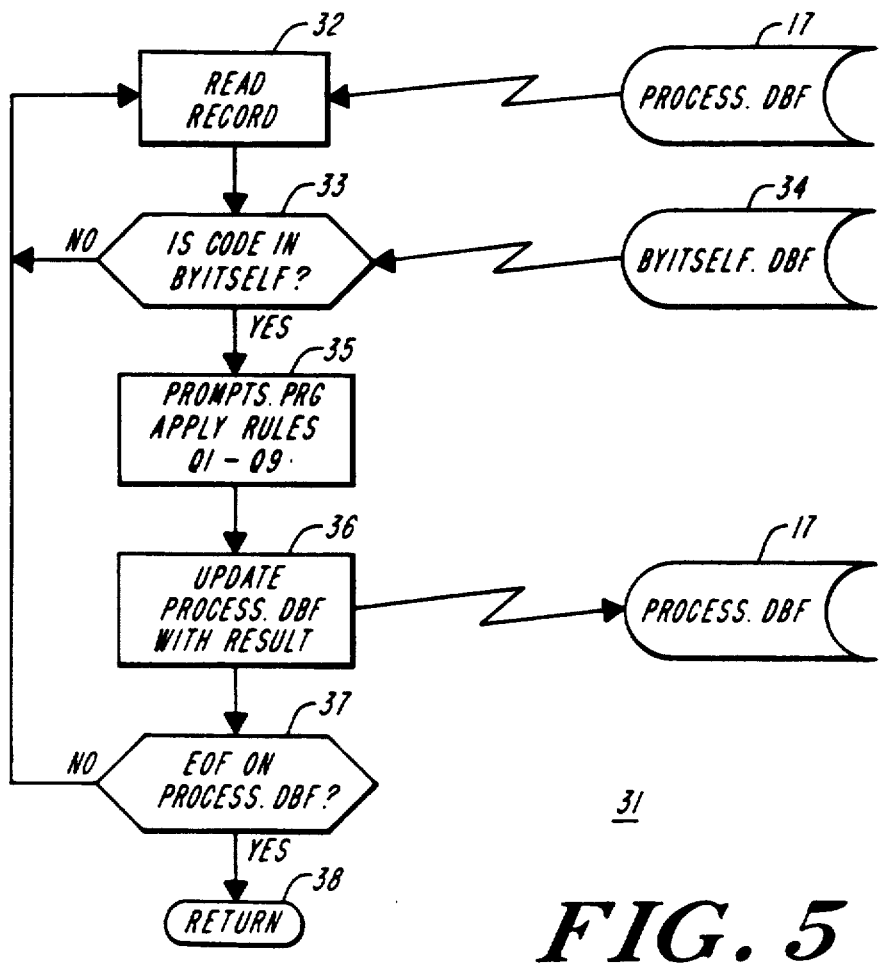
FIG. 5 is a flowchart of the operation of the computer programmed for single code entries or multiple code entries which survive the flowchart of FIG. 4.

In step 31, the RULES PROGRAM represented by the flowchart of FIG. 5 is run. Referring now to FIG. 5, in step 32 the records of surviving codes are read out from the PROCESS database 17. If the code or one of the codes in step 33 is referenced in the BYITSELF database 34 as having a rule or rules applicable or relevant to it, in step 35 a series of "Q" rules is applied. It must be appreciated that not all codes will be in the BYITSELF database, so that if there are three codes resulting from step 32, perhaps only one of those three will be in the BYITSELF file and will be subject to step 35. If there are no matches with codes in the BYITSELF database, then the process moves directly to step 37. The purpose of the "Q" rules is to address an individual code which is one of the surviving codes after the operation of the MULTIPLE PROGRAM or is the only code on the claim for which payment is requested. The "Q" rules are rules to request more information about a particular code. For example, rule Q1 states that if the code survived the set of rules applied to multiple codes under the MULTIPLE PROGRAM routine or is the only code submitted on the claim, then always a request for more information is made, as specified in the MESSAGE appended to the code. An example of the application of this rule is example 7 in Appendix A. In rule Q2, if certain fields have entries that match the claim, more information is specified in MESSAGE. An example of application of this rule is example 8 of Appendix A. In rule Q3, if the code survives rules applied to multiple codes or is the only code submitted on the claim, and the charge on the claim is greater than a dollar sum given for that code as DOLLARLIM, then the user 3 is directed to request more information as specified in a MESSAGE appended. An example of this rule is example 9 in Appendix A. In rule Q4, if the code survives rules applied to multiple codes or is the only code submitted on the claim, and the charge on the claim is greater then the fee screen for the code in CODELIM, then the user 3 is directed to request more information as specified in MESSAGE. AN example of this rule Q4 is example 10 in Appendix A. In rule Q5, if the code survives the rules applied to multiple codes or is the only code submitted on the claim, and the place of service is POS, then the user 3 is directed to request more information as specified in MESSAGE. In addition, if CODELIM is not equal to 0 and the place of service is POS, the code in question is replaced by CODELIM and the message is flagged by MESSAGETYPE. An example of this rule is example 11 in Appendix A. In rule Q6, if the code survives the rules applied to multiple codes or is the code submitted on the claim, and there is no evidence GE anesthetic as specified in ANESTHESIA, then the user 3 is directed to request more information as specified in MESSAGE. An example of the application of this rule is example 12 in Appendix A. Under rule Q7, if the code survives the rules applied to multiple codes or is the only code submitted on the claim and the patient's age is between BEGAGE and ENDAGE, then the user 3 is directed to request more information as specified in MESSAGE. An example of rule Q7 is example 13 in Appendix A. In rule Q8, if the code survives the rules applied to multiple codes or is the only code submitted on the claim and the diagnosis is DX, then the user 3 is directed to request more information as specified in MESSAGE. In addition, if CODELIM is not equal to 0 and the DX or ICD9CODE is true, the code in question is replaced with CODELIM, and the reason for such action flagged by MESSAGETYPE. In all Q2 through Q9 rules, the reasons are flagged by MESSAGETYPE. An example of the foregoing rule is given in example 14 in Appendix A. In rule Q9, if the code survives the rules applied to multiple codes or code is only one submitted on the form then ACODE is replaced with CODELIM and the reason is flagged by MESSAGETYPE. An example is example 15 in Appendix A. Another rule known as L1 may be used and this rule relates to the amount of payment to be authorized to be paid. Rule L1 applies where the number of codes is greater than one. Rule L1 is different from the other rules in that while the other rules are generally concerned with the correct classification of authorization for payment, rule L1 applies to specific amounts. In rule L1, if ACODE appears with another code in the range of, and includes, BCODE to CCODE, then the payment authorized limits the payment specified in ACODE to some amount DCODE. An example of the foregoing rule is given in example 16 in Appendix A.

Once the "Q" rules have been exercised in step 35, in step 36 the PROCESS database 17 is once again updated and in steps 37 (End of File), and 38, the step 31 of FIG. 2 completes running. At this juncture, the user 3 views the recommendation screen for any relevant rules that have been applied, as discussed above. These recommendations are generally a request for more information, but may be something other than a request as in the case of a specific exclusion message.

In step 39 the PROCESS database 17 is appended to the HISTORY database 40 for recordkeeping purposes and for future use as a means to study these "case histories" and refine, update and change the rules and the knowledge base interpreter 5.

In steps 41 (End of File) and 42, the process of the computer programmed in accordance with the present invention is completed and the program exited from. At this point the user 3 has either confirmed that the code(s) for which payment is requested are valid or have been modified to become valid or have been pended so that more information may be obtained by the user 3 from the physician or his or her billing entity to aid in processing the claims.

Figure 7:
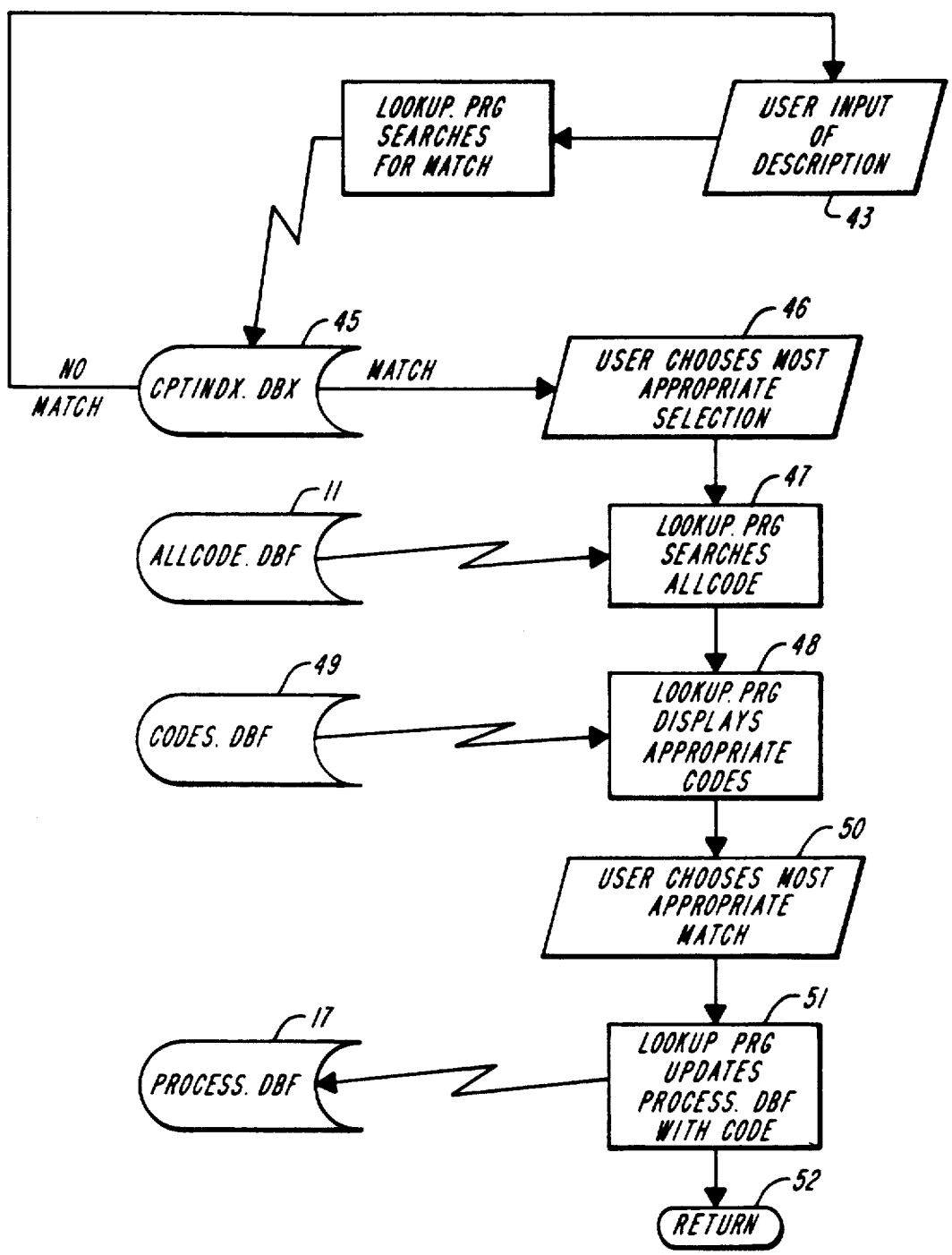
FIG. 7 is a flowchart of the operation of the programmed computer depicting the lookup function of the computer programmed in accordance with the present invention.

Referring now to FIG. 7, the process of the LOOKUP portion 10 of the programmed computer will now be explained. The purpose of the program 10 is to handle those situations in which claims cannot be read out, in step 9 of FIG. 3, from database 8. In step 43, the user 3 inputs a description of the treatment noted on the claims form submitted by the physician or his or her billing entity. The LOOKUP Program 10 searches for a match in step 44 for the description given in step 43 from the index of the CPT-4 manual in a database called CPTINDX 45. The database 45 contains the records of the index, in machine-readable format, of the CPT-4 manual. If a match between input 43 and database 45 does not occur, the process loops back to step 43 for the user to reassess the description given and to give a new description. If, however, a match is made, the program will display a number of related entries from CPTINDX 45 the number of which may be selected by the programmer using well-known programming techniques. The user 3 then chooses, in step 46, what he or she considers to be the most appropriate selection, which the LOOKUP program then searches for in step 47 in the CPT-4 code or other code shown as ALLCODE database 11. In step 48, the codes fetched from the CODES database 49, a subset of ALLCODE database 11, are displayed with their descriptions. In step 50, the user 3 chooses one or more appropriate codes to match the description given in step 43 and the program updates the PROCESS database 17 with this information in step 51. Following such updating, in step 52, the program returns to step 9 as shown in FIG. 3. Of course, the process described with reference to program 10 may be performed with databases other than the CPT-4 example given.

There has been described above a programmed computer system and a method of programming a computer system so that a knowledge base interpreter and a set of rules may facilitate the classification and authorization of payment to health care providers. Since the invention resides in a programmed computer of the automatic programming category, the development of this HISTORY database 40 may lead to the development of new rules and a growth and refinement of the knowledge base interpreter 5. While the foregoing invention has been described with reference to its preferred embodiments, variations and modifications will occur to those skilled in the art. Such variations and modifications are intended to fall within the scope of the appended claims.

APPENDIX A
EXAMPLE 1

Typical Session with CodeReview
Example of "E1/E2" Rule

Computer Prompt: Please enter all CPT-4 procedure codes appearing on the claim, or, if a code is absent, look up the code(s) using the CPT-4 procedure manual or another aid, and enter the code(s).

User enters:
64450
10120

Computer Response:
1. 64450 injection for nerve block
2. 10120 remove foreign body If all codes are as you intended, press Return.
If one or more codes were not intended, press Escape to re-start this session, and enter all intended code(s).

Computer Response: Assign the following code(s) for payment:
1. 10120 remove foreign body To know the reason for the change(s), press Return.
Otherwise, press Escape.

User enters [presses one key]:
Return

Computer Response:
1. 64450 is excluded: because 64450 is inappropriate to use for local anesthesia.
2. 10120 has been accepted with no change.

EXAMPLE 2

Typical Session with CodeReview
Example of "R2" Rule

Computer Prompt: Please enter all CPT-4 procedure codes appearing on the claim, or, if a code is absent, look up the code(s) using the CPT-4 procedure manual or another aid, and enter the code(s).

User enters:
 57250
 58260

Computer Response: 1. 57250 repair vagina and rectum
2. 58260 vaginal hysterectomy If all codes are as you intended, press Return.
If one or more codes were not intended, press Escape to re-start this session, and enter all intended code(s).

Computer Response: Assign the following code(s) for payment:
1. 58265 vaginal hysterectomy and vaginal repair To know the reason for the change(s), press Return.
Otherwise, press Escape.

User enters [presses one key]:
 Return

Computer Response: 1. In combination, codes 57250 and 58260 justify replacement by code 58265.

EXAMPLE 3

Typical Session with CodeReview
Example of an "R1" Rule

Computer Prompt: Please enter all CPT-4 procedure codes appearing on the claim, or, if a code is absent, look up the code(s) using the CPT-4 procedure manual or another aid, and enter the code(s).

User enters:
 52281
 52283

Computer Response: 1. 52281 cystoscopy & treat stricture
2. 52283 cystoscopy & inject stricture If all codes are as you intended, press Return.
If one or more codes were not intended, press Escape to re-start this session, and enter all intended code(s).

Computer Response: Assign the following code(s) for payment:
1. 52283 cystoscopy & inject stricture
2. 51600 injection for bladder xray To know the reason for the change(s), press Return.
Otherwise, press Escape.

User enters [presses one key]:
Return

Computer Response:
1. 52283 has been accepted with no change.
2. 52281 is replaced by 51600, because all but the injection for cystography is included in code 52283.

EXAMPLE 4

Typical Session with CodeReview
Example of "R3" Rule

Computer Prompt: Please enter all CPT-4 procedure codes appearing on the claim, or, if a code is absent, look up the code(s) using the CPT-4 procedure manual or another aid, and enter the code(s).

User enters:
93526
93543
93545

Computer Response:
1. 93526 right and left heart catheterization
2. 93543 injection for heart xrays
3. 93545 injection for coronary xrays If all codes are as you intended, press Return.
If one or more codes were not intended, press Escape to re-start this session, and enter all intended code(s).

Computer Response: Assign the following code(s) for payment:
1. 93549 left & right heart catheterization & angiogram To know the reason for the change(s), press Return.
Otherwise, press Escape.

User enters [presses one key]:
Return

Computer Response:
1. In combination, codes 93526, 93543, and 93545 justify replacement by code 93549.

EXAMPLES
- 10 -

Typical Session with CodeReview
Example of "QM" Rule

Computer Prompt: Please enter all CPT-4 procedure codes appearing on the claim, or, if a code is absent, look up the code(s) using the CPT-4 procedure manual or another aid, and enter the code(s).

User enters:
58980
44000

Computer Response:
1. 58980 laparoscopy of pelvis
2. 44000 enterolysis

If all codes are as you intended, press Return.
If one or more codes were not intended, press Escape to re-start this session, and enter all intended code(s).

User enters [presses one key]:
Return

Computer Response:
?? 1. 58980 laparoscopy of pelvis
?? 2. 44000 enterolysis To know the reason for the question(s), press Return.
Otherwise, press Escape.

User enters [presses one key]:
Return

Computer Response: It is likely that lysis of adhesions occurred as part of the laparoscopy, in which case replace both codes with 58985. If the two procedures were actually separate (unlikely), keep both codes.

EXAMPLE 6

Example of "QS/QB" Rule

Computer Prompt: Please enter all CPT-4 procedure codes appearing on the claim, or, if a code is absent, look up the code(s) using the CPT-4 procedure manual or another aid, and enter the code(s).

User enters:
    35820
    33512

Computer
Response:  1. 35820 explore chest vessels for post-op hemorrhage
            2. 33512 coronary arteries bypass If all codes are as you intended, press Return.
            If one or more codes were not intended, press Escape to
            re-start this session, and enter all intended code(s).

User enters [presses one key]:
    Return

Computer
Response:
    ??  1. 35820 explore chest vessels for post-op hemorrhage
        2. 33512 coronary arteries bypass To know the reason for the question(s), press Return.
        Otherwise, press Escape.

User enters [presses one key]:
    Return

Computer
Response: Before accepting code 35820:
    HAVE:  the operative report reviewed
    BY:    a registered nurse
    WHY:   to determine if the post-op bleeding occurred during
           the same operative session (before leaving the
           recovery room), in which case do not pay for 35820.

EXAMPLE 7

- 12 -

Typical Session with CodeReview

Example of "Q1" Rule

Computer
Prompt :  Please enter all CPT-4 procedure codes appearing on the claim,
          or, if a code is absent, look up the code(s) using the CPT-4
          procedure manual or another aid, and enter the code(s).

User enters:
    58942

Computer
Response:  1. 58942 removal of ovary(ies)

If all codes are as you intended, press Return.
If one or more codes were not intended, press Escape to
re-start this session, and enter all intended code(s).

User enters [presses one key]:
    Return

Computer
Response:
    ?? 1. 58942 removal of ovary(ies)

To know the reason for the question(s), press Return.
    Otherwise, press Escape.

User enters [presses one key]:
    Return

Computer
Response: Confirm a diagnosis of malignancy by looking at the claim,
    or by reviewing the pathology report. If there is no
    malignancy, consider 58940 as a replacement.

*Example 8*

- 13 -

Typical Session with CodeReview
Example of "Q2" Rule

Computer
Prompt : Please enter all CPT-4 procedure codes appearing on the claim,
    or, if a code is absent, look up the code(s) using the CPT-4
    procedure manual or another aid, and enter the code(s).

User enters:
    38300

Computer
Response: 1. 38300 drainage of lymph node abscess; simple

If all codes are as you intended, press Return.
    If one or more codes were not intended, press Escape to
    re-start this session, and enter all intended code(s).

User enters [presses one key]:
    Return

Computer
Response: Enter the type of anesthesia.
                ANESTHESIA CHOICES:
    General
    Regional Spinal
    Local
    Anesthesia type other than those listed above
    Anesthesia type is not provided on the claim, or no evidence
        of anesthesia is provided on the claim User enters [after moving cursor to the correct line]:
    Return Computer
Response: Enter the patient's age.
                    AGE CHOICES:
    Patient's age is 9 or younger
    Patient's age is 10 or older User enters [after moving cursor to the correct line]:
    Return PATH ONE: IF ANESTHESIA WAS GENERAL AND AGE WAS 9 OR YOUNGER:
Computer
Response: Assign the following code(s) for payment:
    1. 38510 biopsy or excision, deep cervical node(s)

To know the reason for the change(s), press Return.
    Otherwise, press Escape.

User enters [presses one key]:
    Return

Computer
Response: 1. 38300 is changed to 38510 because the use of general
    anesthesia demonstrates that this was more difficult
    than a standard, asterisked 38300 procedure; and the
    child's age implies that general anesthesia was
    necessary.

PATH TWO: IF ANY OTHER COMBINATION OF RESPONSES WAS MADE:
Computer
Response: Assign the following code(s) for payment:
    1. 38300 drainage of lymph node abscess; simple To know the reason for the change(s), press Return.
    Otherwise, press Escape.

User enters [presses one key]:
    Return

Computer
Response: 1. 38300 has been accepted with no change.

EXAMPLE 9

Typical Session with CodeReview
Example of "Q3" Rule

Computer Prompt: Please enter all CPT-4 procedure codes appearing on the claim, or, if a code is absent, look up the code(s) using the CPT-4 procedure manual or another aid, and enter the code(s).

User enters:
38500

Computer Response: 1. 38500 biopsy/removal, lymph node(s)

If all codes are as you intended, press Return.
If one or more codes were not intended, press Escape to re-start this session, and enter all intended code(s).

User enters [presses one key]:
Return

Computer Response: Enter the appropriate code charge as it appears on the claim for procedure 38500:
CODE CHARGE CHOICES:
Under $300
$300 or more
No charge is listed for code 38500

User enters [after moving cursor to the correct line]:
Return

PATH ONE: IF CHARGE IS $300 OR MORE:
Computer Response: Assign the following code(s) for payment:
?? 1. 38500 biopsy/removal, lymph node(s)

To know the reason for the question(s), press Return.
Otherwise, press Escape.

User enters [presses one key]:
Return

Computer Response: Before accepting code 38500:
HAVE: the office records reviewed
BY: a registered nurse
WHY: to determine the extent of the procedure, and the location in the body. Consider replacement with any of codes 38510-38525.

PATH TWO: IF CHARGE IS NOT MORE THAN $300:
Computer
Response: Assign the following code(s) for payment:
1. 38500 biopsy/removal, lymph node(s)

To know the reason for the change(s), press Return.
Otherwise, press Escape.

User enters [presses one key]:
Return

Computer
Response: 1. 38500 has been accepted with no change.

EXAMPLE 10

Typical Session with CodeReview
Example of "Q4" Rule

Computer
Prompt: Please enter all CPT-4 procedure codes appearing on the claim, or, if a code is absent, look up the code(s) using the CPT-4 procedure manual or another aid, and enter the code(s).

User enters:
46934

Computer
Response: 1. 46934 destruction of hemorrhoids, internal

If all codes are as you intended, press Return.
If one or more codes were not intended, press Escape to re-start this session, and enter all intended code(s).

User enters [presses one key]:
Return

Computer
Response: Please compare the charge on the claim for procedure 46934 with the payment limit for procedure 46500 (injection into hemorrhoids):
CHARGE COMPARISON:
1. Charge for 46934 is GREATER THAN payment limit for 46500
2. Charge for 46934 is LESS THAN OR EQUAL TO payment limit for 46500
3. No charge is listed on the claim for 46934

User enters [after moving cursor to the correct line]:
Return

PATH ONE: IF CHARGE IS GREATER THAN PAYMENT LIMIT FOR 46500:
Computer
Response: Assign the following code(s) for payment:
?? 1. 46934 destruction of hemorrhoids, internal To know the reason for the question(s), press Return.
Otherwise, press Escape.

User enters [presses one key]:
    Return

Computer
Response: Allow no higher payment than the maximum allowable payment for code 46500.

PATH TWO: IF CHARGE IS <u>NOT GREATER THAN</u> PAYMENT LIMIT FOR 46500:
Computer
Response: Assign the following code(s) for payment:
1. 46934 destruction of hemorrhoids, internal To know the reason for the change(s), press Return.
Otherwise, press Escape.

User enters [presses one key]:
    Return

Computer
Response: 1. 46934 has been accepted with no change.

EXAMPLE 11

Typical Session with CodeReview

Example of "Q5" Rule

Computer
Prompt: Please enter all CPT-4 procedure codes appearing on the claim, or, if a code is absent, look up the code(s) using the CPT-4 procedure manual or another aid, and enter the code(s).

User enters:
    93220

Computer
Response: 1. 93220 vectorcardiogram, with interpretation & report

If all codes are as you intended, press Return.
If one or more codes were not intended, press Escape to re-start this session, and enter all intended code(s).

User enters [presses one key]:
    Return

Computer
Response: Enter the place of service for 93220.
            PLACE OF SERVICE CHOICES:
Inpatient Hospital
Outpatient Hosp./Emergency Dept./Surg. Center Office
Place of service other than those listed above
Place of service is not provided on the claim <u>User enters</u> [after moving cursor to the correct line]:
    Return PATH ONE: IF PLACE OF SERVICE IS <u>INPATIENT</u>:
<u>Computer Response</u>: Assign the following code(s) for payment:
1. 93222 vectorcardiogram, interpretation & report only To know the reason for the change(s), press Return.
Otherwise, press Escape.

<u>User enters</u> [presses one key]:
    Return

<u>Computer Response</u>: 1. 93220 is changed to 93222 because the hospital generally provides equipment and performs the service.

PATH TWO: IF PLACE OF SERVICE IS <u>OTHER THAN INPATIENT</u>:
<u>Computer Response</u>: Assign the following code(s) for payment:
1. 93220 vectorcardiogram, with interpretation & report To know the reason for the change(s), press Return.
Otherwise, press Escape.

<u>User enters</u> [presses one key]:
    Return

<u>Computer Response</u>: 1. 93220 has been accepted with no change.

EXAMPLE 12
- 21 -

Typical Session with CodeReview

<u>Example of "Q6" Rule</u>

<u>Computer Prompt</u>: Please enter all CPT-4 procedure codes appearing on the claim, or, if a code is absent, look up the code(s) using the CPT-4 procedure manual or another aid, and enter the code(s).

<u>User enters</u>:
    92502
    90060

<u>Computer Response</u>:
1. 92502 ear-nose-throat exam with general anesthesia
2. 90060 visit, intermediate, established patient If all codes are as you intended, press Return.
If one or more codes were not intended, press Escape to
re-start this session, and enter all intended code(s).

User enters [presses one key]:
   Return

**Computer
Response:** Enter the type of anesthesia listed on the claim.
   ANESTHESIA CHOICES:
   General
   Regional
   Spinal
   Local
   Anesthesia type other than those listed above
   Anesthesia type is not provided on the claim, or no evidence
      of anesthesia is provided on the claim

User enters [after moving cursor to the correct line]:
   Return

PATH ONE: IF NO EVIDENCE OF ANESTHESIA PROVIDED/NO TYPE OF ANESTHESIA
   IS LISTED:

**Computer
Response:** Assign the following code(s) for payment:
   1. 90060 visit, intermediate, established patient To know the reason for the change(s), press Return.
   Otherwise, press Escape.

User enters [presses one key]:
   Return

**Computer
Response:** 1. 90060 has been accepted with no change.
   2. 92502 is excluded: because there was no evidence that
      general anesthesia was used.

PATH TWO: IF ANY OTHER RESPONSE ABOUT ANESTHESIA WAS MADE:

**Computer
Response:** Assign the following code(s) for payment:
   1. 92502 ear-nose-throat exam with general anesthesia
   2. 90060 visit, intermediate, established patient To know the reason for the change(s), press Return.
   Otherwise, press Escape.

User enters [presses one key]:
   Return

**Computer
Response:** 1. 90060 has been accepted with no change.
   2. 92502 has been accepted with no change.

EXAMPLE 13

Typical Session with CodeReview
Example of "Q7" Rule

Computer Prompt: Please enter all CPT-4 procedure codes appearing on the claim, or, if a code is absent, look up the code(s) using the CPT-4 procedure manual or another aid, and enter the code(s).

User enters:
    54380

Computer Response: 1. 54380 repair penis for epispadias

If all codes are as you intended, press Return.
    If one or more codes were not intended, press Escape to re-start this session, and enter all intended code(s).

User enters [presses one key]:
    Return

Computer Response: Enter the patient's age.
                    AGE CHOICES:
    Patient's age is 17 or younger
    Patient's age is 18 or older

User enters [after moving cursor to the correct line]:
    Return

PATH ONE: IF THE AGE IS 18 OR OLDER:
Computer Response:
    ?? 1. 54380 repair penis for epispadias To know the reason for the question(s), press Return.
    Otherwise, press Escape.

User enters [presses one key]:
    Return

Computer Response: Before accepting code 54380:
    HAVE: the operative report reviewed
    BY: a physician
    WHY: What was really done, and was this really epispadias? In a non-pediatric patient, the procedure is usually for hypospadias.

PATH TWO: IF THE AGE IS 17 OR YOUNGER:
Computer Response:
    1. 54380 repair penis for epispadias To know the reason for the question(s), press Return.
Otherwise, press Escape.

User enters [presses one key]:
    Return

Computer Response: 1. 54380 has been accepted with no change.

*EXAMPLE 14*

Typical Session with CodeReview
Example of "Q8" Rule

Computer Prompt: Please enter all CPT-4 procedure codes appearing on the claim, or, if a code is absent, look up the code(s) using the CPT-4 procedure manual or another aid, and enter the code(s).

User enters:
    64782

Computer Response: 1. 64782 remove neuroma, hand or foot nerve

If all codes are as you intended, press Return.
If one or more codes were not intended, press Escape to re-start this session, and enter all intended code(s).

User enters [presses one key]:
    Return

Computer Response: Enter the provider's specialty as it appears on the claim:
    PROVIDER SPECIALTY CHOICES:
    Podiatrist, DPM, foot doctor, foot group
    Specialty other than podiatrist/DPM/foot doctor/foot group
    No provider specialty is listed on the claim

User enters [after moving cursor to the correct line]:
    Return

PATH ONE: IF PROVIDER IS A PODIATRIST:

Computer Response: Assign the following code(s) for payment:
    1. 28080 remove Morton's neuroma, foot To know the reason for the change(s), press Return.
Otherwise, press Escape.

User enters [presses one key]:
    Return

<u>Computer</u>
<u>Response</u>: A neuroma excision performed by a podiatrist is overwhelmingly likely to be a Morton's neurectomy, even if not coded as such. Therefore, code 64782 has been replaced by 28080.

PATH TWO: IF PROVIDER IS <u>NOT A PODIATRIST</u>:
<u>Computer</u>
<u>Response</u>: Assign the following code(s) for payment:
1. 64782 remove neuroma, hand or foot nerve To know the reason for the change(s), press Return.
Otherwise, press Escape.

<u>User enters</u> [presses one key]:
Return

<u>Computer</u>
<u>Response</u>: 1. 64782 has been accepted with no change.

*Example 15*
- 27 -

Typical Session with CodeReview

Example of "Q9" Rule

<u>Computer</u>
<u>Prompt</u>: Please enter all CPT-4 procedure codes appearing on the claim, or, if a code is absent, look up the code(s) using the CPT-4 procedure manual or another aid, and enter the code(s).

<u>User enters</u>:
58605

<u>Computer</u>
<u>Response</u>: 1. 58605 division of fallopian tube (postpartum during same hospitalization)

If all codes are as you intended, press Return.
If one or more codes were not intended, press Escape to re-start this session, and enter all intended code(s).

<u>User enters</u> [presses one key]:
Return

<u>Computer</u>
<u>Response</u>: Assign the following code(s) for payment:
1. 58600 division of fallopian tube To know the reason for the change(s), press Return.
Otherwise, press Escape.

<u>User enters</u> [presses one key]:
Return

Computer
Response: Code 58600 is used if fallopian tube ligation/transection was the only procedure performed during an admission.

*EXAMPLE 16*

Typical Session with CodeReview
Example of "L1" Rule

Computer
Prompt: Please enter all CPT-4 procedure codes appearing on the claim, or, if a code is absent, look up the code(s) using the CPT-4 procedure manual or another aid, and enter the code(s).

User enters:
43830
43840

Computer
Response:
1. 43830 surgical opening of stomach
2. 43840 repair of stomach lesion If all codes are as you intended, press Return.
If one or more codes were not intended, press Escape to re-start this session, and enter all intended code(s).

Computer
Response: Assign the following code(s) for payment:
?? 1. 43830 surgical opening of stomach
2. 43840 repair of stomach lesion To know the reason for the question(s), press Return.
Otherwise, press Escape.

User enters [presses one key]:
Return

Computer
Response:
1. 43830 Limit payment of 43830 to $150, because it appears with 43840.
2. 43840 has been accepted with no change.

*EXAMPLE 17*

Typical Session with CodeReview
Example of "EP" Rule

Computer
Prompt: Please enter all CPT-4 procedure codes appearing on the claim, or, if a code is absent, look up the code(s) using the CPT-4 procedure manual or another aid, and enter the code(s).

<u>User enters:</u>
93005
93010

<u>Computer Response:</u>
1. 93005 electrocardiogram, tracing only
2. 93010 electrocardiogram, interpretation & report only If all codes are as you intended, press Return.
If one or more codes were not intended, press Escape to re-start this session, and enter all intended code(s).

<u>User enters [presses one key]:</u>
Return

<u>Computer Response:</u> Enter the place of service.
PLACE OF SERVICE CHOICES:
Inpatient Hospital
Outpatient Hosp./Emergency Dept./Surg. Center
Office
Place of service other than those listed above
Place of service is not provided on the claim <u>User enters [after moving cursor to the correct line]:</u>
Return PATH ONE: IF PLACE OF SERVICE IS <u>INPATIENT</u>:
<u>Computer Response:</u> Assign the following code(s) for payment:
1. 93010 electrocardiogram, interpretation & report only To know the reason for the change(s), press Return.
Otherwise, press Escape.

<u>User enters [presses one key]:</u>
Return

<u>Computer Response:</u>
1. 93005 is excluded: because the hospital generally provides equipment and performs the service.
2. 93010 has been accepted with no change.

2. PATH TWO: IF PLACE OF SERVICE IS <u>OTHER THAN INPATIENT</u>:
<u>Computer Response:</u> Assign the following code(s) for payment:
1. 93000 electrocardiogram, complete To know the reason for the change(s), press Return.
Otherwise, press Escape.

<u>User enters [presses one key]:</u>
Return

<u>Computer Response:</u>
1. In combination, codes 93005 and 93010 justify replacement by code 93000.

*EXAMPLE 18*

- 8 -

Typical Session with CodeReview
Example of "EA" Rule

Computer Prompt: Please enter all CPT-4 procedure codes appearing on the claim, or, if a code is absent, look up the code(s) using the CPT-4 procedure manual or another aid, and enter the code(s).

User enters:
93503
93501

Computer Response:
1. 93503 right heart cath; Swan-Ganz catheter
2. 93501 right heart catheterization; only If all codes are as you intended, press Return.
If one or more codes were not intended, press Escape to re-start this session, and enter all intended code(s).

User enters [presses one key]:
Return

Computer Response: Enter the age of the patient.
AGE CHOICES:
Age 20 or younger
Age 21 or older

User enters [after moving cursor to the correct line]:
Return

PATH ONE: IF AGE IS 20 OR YOUNGER:
Computer Response: Assign the following code(s) for payment:
1. 93503 right heart cath; Swan-Ganz catheter To know the reason for the change(s), press Return.
Otherwise, press Escape.

User enters [presses one key]:
Return

Computer Response:
1. 93503 has been accepted with no change.
2. 93501 is excluded: because, in this age group, the two procedures are virtually identical.

PATH TWO: IF AGE IS 21 OR OLDER:
Computer Response: Assign the following code(s) for payment:
1. 93503 right heart cath; Swan-Ganz catheter
2. 93501 right heart catheterization; only To know the reason for the change(s), press Return.
Otherwise, press Escape.

User enters [presses one key]:
Return

Computer Response:
1. 93503 has been accepted with no change.
2. 93501 has been accepted with no change.

APPENDIX B

RULES DESCRIPTIONS

PART I.

Rules Applied to Multiple Codes: Contained in INTERACT.dbf

| RULE | DESCRIPTION |
|---|---|

Replace ACODE with DCODE

R1      If ACODE appears with another code in the range of (and including) BCODE to CCODE,
         delete ACODE, keep BCODE to CCODE, and add DCODE.

Replace ACODE, BCODE, CCODE, and DCODE (in ascending order) with ECODE

R2      If ACODE appears with BCODE,
         delete ACODE and BCODE and add CCODE.

R3      If ACODE appears with BCODE and CCODE,
         delete ACODE, BCODE, and CCODE, and add DCODE.

R4      If ACODE appears with BCODE, CCODE, and DCODE,
         delete ACODE, BCODE, CCODE, and DCODE, and add ECODE.

Exclude BCODE to CCODE (Keep ACODE)

E2      If ACODE appears with another code in the range of (and including) BCODE to CCODE,
         exclude BCODE to CCODE, and keep ACODE.

Keep BCODE to CCODE (Exclude ACODE)

E1      If ACODE appears with another code in the range of (and including) BCODE to CCODE,
         exclude ACODE, and keep BCODE to CCODE.

Limit ACODE payment

L1   If ACODE appears with another code in the range of (and including) BCODE to CCODE,
   limit the payment of ACODE to DCODE.

EP   If ACODE appears with another code in the range of (and including) BCODE to CCODE, and in POS is ECODE,
   then exclude ACODE and keep BCODE to CCODE.

EA   If ACODE appears with BCODE and if AGE is between CCODE to DCODE,
   then exclude ACODE and keep BCODE.

Query for More Info because of Multiple Codes

QM   If ACODE appears with another code in the range of BCODE to DCODE, there is a question about this combination of codes.

QS   If ACODE appears with another code in the range of BCODE to CCODE, then there is a question about ACODE.

QB   If ACODE appears with another code in the range of BCODE to CCODE, then there is a question about the code in the BCODE to CCODE range.

IN ALL THE ABOVE CASES, IF THERE IS A SPECIFIC MESSAGE APPLIED TO THE RULE FOR WHICH CERTAIN CHANGES OCCUR, THEN THE MESSAGE NUMBER RESIDES IN ECODE, AND THE CORRESPONDING MESSAGE IS IN MESSAGE.dbf.

PART II.

Rules applied to each code individually: Contained in BYITSELF.dbf

| RULE | DESCRIPTION |
|---|---|
| Q1 | If CODE survives rules applied to multiple codes or CODE is only one submitted on the claim, then _always_ request more information ("by report") as specified in MESSAGE. |
| Q2 | If CODE survives rules applied to multiple codes or CODE is only one submitted on the form and more than one of the following fields have entries that match the claim: DOLLARLIM, CODELIM, POS, ANESTHESIA, BEGAGE to ENDAGE, DX, then request more information as specified in MESSAGE. |
| Q3 | If CODE survives rules applied to multiple codes or CODE is only one submitted on the form and the charge on the claim is greater than DOLLALIM, then request more information as specified in MESSAGE. |

Q4   If CODE survives rules applied to multiple codes or CODE is only one submitted on the form and the charge on the claim is greater than the fee screen for CODELIM,
    then request more information as specified in MESSAGE.

Q5   If CODE survives rules applied to multiple codes or CODE is only one submitted on the form and the place of service is POS,
    then request more information as specified in MESSAGE.
   In addition, if CODELIM = 0 and the place of service is POS,
    replace the code in question with CODELIM and the reason is flagged by MESSAGETYPE.

Q6   If CODE survives rules applied to multiple codes or CODE is only one submitted on the form and there is no evidence of anesthetic as specified in ANESTHESIA,
    then request more information as specified in MESSAGE.

Q7   If CODE survives rules applied to multiple codes or CODE is only one submitted on the form and the patient's age is between BEGAGE and ENDAGE,
    then request more information as specified in MESSAGE.

Q8   If CODE survives rules applied to multiple codes or CODE is only one submitted on the form and the diagnosis is DX,
    then request more information as specified in MESSAGE.
   In addition, if CODELIM = 0 and the DX, or ICD9CODE (or provider) is true,
    then replace the code in question with CODELIM, and the reason is flagged by MESSAGETYPE.

Q9   If CODE survives the rules applied to multiple codes or CODE is only one submitted on the form,
    then replace ACODE with CODELIM, and the reason is flagged by MESSAGETYPE.

APPENDIX C

ALLCODE:
    Allcode is the file which contains every code, as well as information which pertains to certain codes code.

CODE = presented code (all codes represented)

TITLE4 = description of code from CPT-4 tape

RVU = rvu of code (relative value unit)

AST = indicate if a global procedure (all inclusive)

SUPERSED:
- CODE = presented code which is to be superseded
- SUPERCODE = the code(s) which supersedes "CODE"

INTERACT:
| | | |
|---|---|---|
| ACODE = contains CPT-4 codes | | all rules |
| RULE = E1, E2, R1-RN, QM, QS, QB, L1 | | |
| BCODE, CODE = contains CPT-4 codes | | all rules |
| DCODE = cpt4 code | | R1, R3 + |
| DCODE = dollar amount | | L1 |
| ECODE = cpt4 code | | R4 |
| ECODE = messagetype | | all rules except R4 and above |

- ENTRYDATE = holds date rule was entered
- INTERVIEW = holds date rule was developed

BYITSELF:

- CODE = code which presents a problem when presented either by itself or with other codes
- ENTRYDATE = holds date rule was entered
- INTERVIEW = holds date rule was developed
- RULE = Q1, Q2,....Q9
- SINGLE = currently indicates, if true, that the code needs to be either the sole surviving code, or the only code on the claim, in order for the rule (in RULE) to be fired. This field is currently under revision to become broader in scope, ie if the coe is the only surviving code do rule A, or if the code is with other codes, do rule B.
- MESAGETYPE = internally assigned 'code' which will match a type in MESSAGE.dbf, which contains English language messages for the CodeReview user.

| | |
|---|---|
| DOLLARLIM = $ limit which if exceeded leads user to more information, else accept code | Q3 |
| POS = place of service | Q5 |
| ANESTHESIA = contains a type of anethesia (general) | Q6 |
| BEGAGE = start of an age range inappropriate for the procedure | Q7 |
| ENDAGE = end of the age range inappropriate for the prcedure | Q7 |
| DX = diagnosis(es) inappropriate for the procedure | Q8 |
| ICD9CODE = ICD-9-CM diagnosis code inapproroiate for the procedure | Q8 |
| CODELIM = code which the charge for CODE will be compared to (greater than, less than) | Q4 |

CODELIM = code which will replace code if 1) if the POS is inappropriate    05

2) if the DX-or ICD9CODE is inappropriate  08

3) in all circumstances for 2?    09

MESSAGE:

TYPE = assign code name for message

ORIGIN = indicates multiple, single or both

OP = ask for op report?

PATH = ask for pathology report?

OFF = ask for office records?

HOS = ask for hospital progress notes?

OTHER = ask for another claim?

REVIEWER = is the type of reviewer the asked-for
            information should be sent to and reviewed
            by (ie nurse, supervisor, physician etc)

TOLOOKFOR = specified items that the reviewer should
            look for upon receiving the asked-for
            information ENTRYDATE = holds date rule was entered INTERVIEW = holds date rule was developed

APPENDIX D

```
CLOSE DATABASES
set bell off
SET TALK OFF
SET ECHO OFF
SET CONFIRM ON
SET EXACT OFF
set scoreboard off
set deleted on
set status off PUBLIC CLIPPER
SELECT 1
USE CONFIG
session = session_no-1
failed = .f.
note = .t.
xclaim_no = ' '
get_date = .t.
one_date = .t.
temp_date=('  /  /  ')
IF COLOR
    company = company
    COLORM = COLMAIN
    COLORH = COLHELP
    col_look = col_look
    col_sav = col_say
    SET COLOR TO &COLORM
    color = .t.
else
    color = .f.
ENDIF
select 1
use
clear
```

```
*   SELECT 3                              && opened and closed in entry.prg
*   USE SUPERSED INDEX SUPERSED
*   SELECT 4                              && multiple.prg, action
*   USE INTERACT INDEX INTERACT
**  SELECT 5
**  USE BYITSELF INDEX BYITSELF           && rules.prg
**  SELECT 6
**  USE MESSAGE INDEX MESSAGE             && rules.prg
**  select 10                             && recomm.prg
**  use new
*   memory variables header = ' '
helpline = ' '
e_col = 12
c_col = 21
d_col = 33
m_col = 71
s_col = e_col -5
l_col = s_col -6
g_col = 8
if clipper
helpline1 = ;
-Modify Code     Esc-Exit'
enter = '<Enter> '+chr(17)+chr(196)+chr(217)
helpline8 = ;
'F1-Help                     '+ enter + 'Recommendations                    Esc-Exit '
helpline9 = ;
'                 <Enter claim number in space provided>
header2=company + space(13)+'INDEX LOOKUP SCREEN' + space(16) + dtoc(date())
helpline5 = ;
- Make Selection                   Esc-Return'
helpline6 = ;
- Make Selection         Esc-Choose New Text'
else
helpline1 = ;
'CHOICE: [ ]   P - Process    A - Add      # - Modify Code   R - Restart    Q - Quit' helpline3 =;
'CHOICE: [ ]    X - Explain Recommendations      N - New Session      Q - Quit'
helpline4 = ;
'CHOICE: [ ]                   N - New Session                    Q - Quit'
endif
helpline2 = ;
'          CodeReview is processing input codes ... please stand by           '
header1=company + space(10)+'CodeReview' + space(9) + '(C) Copyright HFR Inc. 1988'
*header9=company + space(18)+'CodeReview'+space(9) + 'Claim #: '+xclaim_no
helpline7 = ;
'                           ESC - Exit Help                                    ' choice = 'P'
do while .t.
    select 1
    use config
    session=session+1
    replace session_no with session
    close databases
    code_count = 0
    code_cnt = 0
    SELECT 1
    USE ALLCODE INDEX ALLCODE
    SELECT 2
    USE PROCESS
    clear
    if clipper
        select 8
        use cptindx index cptindx
        select 9
        use tempcpt index tempcpt
    endif
    DO ENTRY
    if choice = 'R'
        loop
    else
        if choice = 'Q'
            close databases
```

```
      return
   endif
endif
if one_date .or. .not. get_date
   select process
   temp_date=code_date
   if code_count > 1
      DO MULTIPLE.prg      && exclude, replacement, QM rules
   endif
   DO RULES.PRG
else
   select process
   go top
   temp_date=code_date
   set filter to endstatus $ 'AP' .and. code_date=temp_date
   go top
   count to code_count
      go top
      do while .not. eof() .and. code_date=temp_date
         if code_count > 1
            DO MULTIPLE.prg      && exclude, replacement, QM rules
         endif
         DO RULES.PRG
         select process
         set filter to code_date=temp_date
         go bott
         set filter to
         skip
         if eof()
            exit
         endif
         temp_date=code_date
         set filter to endstatus $ 'AP' .and. code_date=temp_date
         go top
         count to code_count
         go top
      enddo
   endif
   do recomm
   if clipper
      loop
   else
      if choice = 'N'
         loop
      endif
   endif
   exit
enddo
CLOSE DATABASES

* ENTRY.PRG
** PAINT SCREEN select 3
use supersed index supersed
SET PROCEDURE TO PROCS1
header= header1
sup_date=ctod('  /  /  ')
IF CLIPPER
   do setkey with .t.
endif
esc = .f.
store space(5) to code1,code2,code3,code4,code5,code6,code7,code8
help_field = 1
dnkey = .f.
upkey = .f.
mode = 0
see = .f.
store ' ' to scrn1,scrn2,scrn3
xcode_date = ctod('  /  /  ')
get_date = .t.
set date american
```

```
@ 1,1 get header
**@ 23,1 get helpline9
**clear gets
**@ 6,6 say 'Enter claim number:  '
**xclaim_no = space(10)
**@ 6,30 get xclaim_no
**read
**clear gets

**clear
**header9=company + space(18)+'CodeReview'+space(9) + 'Claim #: '+xclaim_no
**@1,1 get header9

@ 3,s_col say 'INPUT CODE'
@ 4,s_col to 4,s_col + 9
@ 3,c_col say 'DATE'
@ 4,c_col to 4,c_col + 3
@ 3,d_col SAY 'DESCRIPTION'
@ 4,d_col to 4,d_col + 10
@ 3,m_col-1 say 'CHARGE'
@ 4,m_col-1 to 4,m_col + 4
helpline = helpline1
@ 23,1 get helpline
clear gets select process
set safety off
zap
set safety on

** MEMORY VARIABLES
choice = 'P'
help_on = .f.
LIN = '_'
row = 6
counter = 1
done = .f.
get_charge = .t.
add  = t SELECT PROCESS
append blank
replace begstatus with 'P',endstatus with 'P', session_no with session
do while .not. done
    store .f. to upkey,dnkey
    @ row,s_col say str(counter,2) + '.'
    DO GETCODE
    SELECT PROCESS
    if clipper
        if upkey
            row = row - 1
            counter = counter - 1
            skip - 1
            loop
        endif
    endif
    if .not. done .and. counter < 8
        counter = counter + 1
        save_rec = recno()
        go bott
        if recno() = save_rec
            append blank
            replace begstatus with 'P',endstatus with 'P', session_no ;
                with session
        else
            go save_rec
            skip
        endif
    endif
    row = counter + 5
enddo
do while .t.
    if clipper
        exit
    endif
    SELECT PROCESS
    choice = 'P'
```

```
SET CONFIRM OFF
@ 23,10 get choice picture '!'
read
SET CONFIRM ON
if .not. (trim(choice) $ 'AHPRQ' .or. (val(choice) > 0 ;
                                       .and. val(choice) <= counter))
    ?? chr(7)
    loop
else
    mod_rec = val(choice)
    do case
        case choice = 'A' .or. val(choice) = counter
            IF COUNTER < 8
                done = .f.
                SELECT PROCESS
                append blank
                replace begstatus with 'P',endstatus with 'P'
                row = counter + 5
                @ row,s_col say str(counter,2) + '.'
                do getcode
                if .not. done            && code was added
                    counter = counter + 1 && increment for next time around
                endif
            ENDIF case mod_rec > 0 .and. mod_rec < 10
            go mod_rec
            row = mod_rec * 5
            do getcode case choice = 'P'
            exit case choice = 'RQ'
            exit case choice = 'H'
            do help
    endcase
    if choice $ 'RQ'
        return
    endif
    choice = 'P'
endif
enddo
if .not. esc
    helpline = helpline2
    @ 23,1 get helpline
    clear gets
    select process
    go bott
    if code = 0
        delete
        pack
    endif
**  count to code_count
    set safety off
    select process
    set filter to endstatus = 'S'
    go top
    do while .not. eof()
        xreplace = replacedby
        sup_date=code_date
        append blank
        replace session_no with session,outcome with choice,code with;
            xreplace,begstatus with 'S',code_date with sup_date, ;
            endstatus with 'A'
        skip
    enddo
    set filter to
    set date ansi
    index on dtoc(code_date) + str(code,5) to process
    set filter to endstatus $ 'AP'
    count to code_count
    go top
    do while .not. eof()
        tem_date=code_date
```

```
            skip
            if code_date <> tem_date
               one_date = .f.
               exit
            endif
         enddo
         select 2
         use process index process
         select 3
         use
endif
IF CLIPPER
      do setkey with .f.
endif return

* PROCS.PRG

PROCEDURE GETCODE
*
      tries = 1
      DO WHILE .T.
            SELECT PROCESS
            if code = 0
                  xcode = space(5)
            else
                  xcode = str(code,5)
            endif
            @ row,e_col get xcode picture '99999'
            help_field = 1
            read
            IF ESC
                  return
            ENDIF
            if xcode = space(5)
                  @ row,s_col say space(11)
                  if upkey
                        exit
                  endif
                  done = .t.
                  if counter = 1 .and. clipper
                        choice = 'Q'
                  else
                        choice = 'P'
                  endif
                  RETURN
            endif
            IF CLIPPER .and. help_on
                  LOOP
            ENDIF
               replace code with val(xcode)
               SELECT ALLCODE
               set exact on
               SEEK PROCESS->code
               set exact off
               if .not. eof()
                  SELECT SUPERSED
                  SEEK PROCESS->code
                  if .not. eof()
                        select process
                        replace endstatus with 'S',replacedby with ;
                                    supersed->supercode
                  else
                        SELECT PROCESS
                        if begstatus = 'P' .and. endstatus $ 'IS'
                        replace endstatus with 'P',replacedby with 0
                        endif
                  endif
                  @ row,e_col say PROCESS->code picture '99999'
                  @ row,d_col say allcode->title4
               else
                  if tries = 1
                        ?? chr(7)
                        mess = 'INVALID CODE !!'
                        @ row,d_col say substr(mess + space(18),1,28)
                        tries = 2
                        loop
```

```
                    else
                        @ row,e_col say PROCESS->code picture '99999'
                        @ row,d_col say 'Invalid code will be ignored'
                        SELECT PROCESS
                            replace
                            re 1oo endstatus with 'I'
                    endif
                endif
            SELECT PROCESS
            if get_date .and. .not. upkey .and. .not. dnkey .and. .not. done
                @ row,c_col get xcode_date
                help_field = 2
                read
                if esc
                    return
                endif
                if year(xcode_date) = 0 .and. counter = 1
                    get_date = .f.
                    @ row,c_col say space(8)
                    @ 3,c_col say space(5)
                    @ 4,c_col say space(5)
                else
                    @ row,c_col say dtoc(xcode_date)
                endif
                    replace code_date with xcode_date
            endif
            if counter = 1
                @ row,m_col-1 say '$'
*************         CHECK FOR DUPES
            else
                save_recno = recno()
                ycode_date = code_date
                go top
                locate for code=val(xcode) .and. recno()< save_recno ;
                        .and. code_date = ycode_date && .and. endstatus <> 'L'
                if .not. eof()
                    go save_recno
                    replace endstatus with 'L'
                else
                    go save_recno
                endif
            endif
            if get_charge .and. code <> 0 .and. .not. upkey .and..not. dnkey;
                        .and. .not. done
                @ row,m_col get claim_amt picture '99999'
                help_field = 3
                read
                if esc
                    return
                endif
                @ row,m_col say claim_amt picture '99999'
            endif
            if counter = 1
                if claim_amt = 0
                    get_charge = .f.
                    @ row,m_col - 2 say space(8)
                    @ 3,m_col-1 say space(7)
                    @ 4,m_col-1 say space(7)
                endif
            endif
            exit
        enddo
RETURN PROCEDURE HELP
*
RETURN
do setkey with .f.
IF CLIPPER
    SAVE SCREEN
    HELP_ON = .T.
ENDIF
save_help = helpline
helpline = helpline7
@ 23,1 get helpline
clear gets
SELECT PROCESS
```

```
store SPACE(6) to help1,help2,help3,help4
if color
    SET COLOR TO &COLORH
endif
*@ 16,5 CLEAR TO 21,73
*@ 16,5 to 21,73  double
help_on = .t.
do case
    case help_field = 1
        mess ='Enter the CPT-4 code as it appears on the claim form. ';
    + 'If you are unsure of the code, press <F2> to do a lookup by the ';
    + 'index of the CPT-4 Manual' do format1 with mess,14,15,63
    case help_field = 2
        mess = 'Enter the date as it appears on the claim form. This is ';
    + 'optional' do format1 with mess,14,15,63 case help_field = 3
        mess = 'Enter the dollar amount of the claim '
        do format1 with mess,14,15,63 case choice = 'H'
help1 = '     "P" -- Process; all codes have been correctly input'
help2 = '     "A" -- Add another code'
help3 = '     "#" -- Enter line number to edit code already input'
help4 = '     "Q" -- Quit session'
    case code = 0
help1 = '          CPT-4 CODE ENTRY -- HELP SCREEN'
help3 = '    This is the help module for entry of a CPT-4 code '
help4 = '    In this case, the code has not yet been input' case begstatus = 'P' .and. endstatus = 'P'
help1 = '          CPT-4 CODE -- SUCCESSFUL ENTRY'
help3 = '       CPT-4 code has been successfully entered'
help4 = '       Both begstatus and endstatus are "P"' case endstatus = 'I'
help1 = '              INVALID CODE'
help2 = 'The CPT-4 code which has been entered is invalid.  The code'
help3 = 'may be either corrected or left as is.  Processing will continue'
help4 = 'and the program will simply ignore the any invalid codes' case begstatus = 'S' .and. endstatus = 'A'
help1 = '              SUPERSEDED CODE'
help2 = ' The code which was entered has been superseded by another'
help3 = ' code following rules in the September, 1987 "Manual of '
help4 = ' CPT-4 Codes"' endcase

@ 17,8 say help1
@ 18,8 say help2
@ 19,8 say help3
@ 20,8 say help4
if color
    SET COLOR TO &COLORM
endif
help_on = .f.
IF CLIPPER
    do while inkey() <> 27
    enddo
    RESTORE SCREEN
    do setkey with .t.
ELSE
    @ 16,5 clear to 21,73
    helpline = save_help
    @ 23,1 get helpline
    clear gets
ENDIF
return

PROCEDURE SETKEY
*
```

```
parameter setflag
if setflag
    set key -4 to HIT_KEY
    set key -1 to HIT_KEY
    set key 5 to upkey
    set key 27 to HIT_KEY
    set key 24 to dnkey
else
    set key -9 to            && F10
    set key -8 to
    set key -7 to            && F8
    set key -6 to
    set key -5 to
    set key -4 to            && F5
    set key -3 to
    set key -2 to
    set key -1 to            && F2
    set key 1 to             && home
    set key 3 to             && pagedn
    set key 4 to             && right
    set key 5 to             && upkey
    set key 6 to             && end
    set key 18 to            && pageup
    set key 19 to            && left
    set key 24 to            && downkey
    set key 27 to            && escape
endif
return PROCEDURE HIT_KEY
*
parameter pn,pl,rv
DO CASE
    CASE LASTKEY() = 27
        CLEAR GETS
        DONE = .T.
        SELECT PROSPECT
        GO BOTT
        IF RECNO() = 1 .OR. EOF()
            CHOICE = 'Q'
        ELSE
            CHOICE = 'R'
        ENDIF
        ESC = .T.
        RETURN CASE LASTKEY() = -1
                      with .f.
        do setkey with .f.
        DO LOOKUP.prg
        do setkey with .t.

CASE LASTKEY() = -4
        CLEAR GETS
        DONE = .T.
        CHOICE = 'P'
ENDCASE
RETURN procedure upkey
*
if counter > 1
    keyboard chr(13)
    UPKEY = .T.
ENDIF
return procedure dnkey
*
save_rec = recno()
go bott
if recno() > save_rec
        keyboard chr(13)
endif
dnkey = .t.
go save_rec
return
```

```
SET PROCEDURE TO action
select 4
use interact index interact

TEMP = 0
NUMCODE = 0
TTRIGGER = 0
NEW = 0
store .t. to again
k = 1 do while again

**    DO samecode
**    if code_cnt > 1
        DO exclude                  && Checks exclusion rules
        select process
**      set filter to endstatus $ 'AP' .and. code_date=temp_date
        go top
        code_cnt = 0
        count to code_cnt    && for endstatus $ 'AP' .and. code_date=temp_date
        if code_cnt > 1
          DO replace                         && Checks replacement rules
          count to code_cnt   && for endstatus $ 'AP' .and. code_date=temp_date
          if code_cnt > 1
             do r1s                          && checks r1 rules
          else
**           store .f. to again
             exit
          endif
        else
**        store .f. to again
          exit
        endif
**    else
**    store .f. to again
**    exit
**    endif
enddo select process
code_cnt = 0
count to code_cnt for endstatus $ 'AP' .and. code_date=temp_date
if code_cnt > 1
  DO query
endif
release all
select interact
use

RETURN

*** ACTION.PRG

*** 3/20/88 MODIFICATIONS

***    --PROCESS FILTER NOT TURNED OFF AT END OF EXCLUDE, SINCE SAME FILTER
***      IS USED IN KEEP
***    --INTERACT IS NOW INDEXED ON SUBSTR(ACODE,5) + RULE.  INSTEAD OF SETTING
***      FILTER, SEEK IS DONE TO ARRIVE AT APPROPRIATE RULE.
***    --RULE "K" CHANGED TO "E1"; RULE "E" CHANGED TO "E2";  THESE CHANGES MADE
***       IN INTERACT
***    --MEMORY VARIABLES NOT USED IN PROCESSING

PROCEDURE exclude

* --- checks rules for exclusion and makes appropriate changes
*
* select process
  set filter to endstatus $ 'AP' .and. code_date=temp_date
  go top
  do while .not. eof() .and. code_date=temp_date
       NUMCODE = 0
       TEMP = CODE
```

```
    PROC_REC = RECNO()
    SELECT INTERACT
    SEEK str(TEMP,5) + 'E'
    IF .NOT. FOUND()
      SELECT PROCESS
      GO PROC_REC
      SKIP
      LOOP
    ENDIF
    EXCL_REC = RECNO()

select process
    go top
    do while .not. eof() .and. code_date=temp_date
      if code = temp
        skip
        loop
      endif
      SELECT INTERACT                            && replacements
      GO EXCL_REC
      DO WHILE ACODE=TEMP .AND. substr(rule,1,1) = 'E' .and. .NOT. EOF()
        IF BCODE <= process->code .AND. process->code <= CCODE
          IF rule = 'E2'
            SELECT PROCESS
            REPLACE ENDSTATUS WITH "E", TRIGGER WITH TEMP, RULE WITH "E2"
            if interact->ecode<>0
                replace type with interact->ecode
            endif
            EXIT
          ELSE
            IF rule = 'E1'
              SELECT PROCESS
              temp_code = ccode
              temp_rec = recno()
              GO PROC_REC
              REPLACE ENDSTATUS WITH "E",TRIGGER WITH temp_code,RULE WITH "E1"
              if interact->ecode<>0
                  replace type with interact->ecode
              endif
              go temp_rec
              EXIT
            ENDIF
          ENDIF
        ENDIF
        select interact
        SKIP
      ENDDO
      select process
      skip
    ENDDO                                  && Loop 2
    SELECT PROCESS
    GO PROC_REC                            && Moving to next code for evaluation
    SKIP
  enddo
SELECT INTERACT
**SELECT PROCESS
**SET FILTER TO
RETURN PROCEDURE replace

* --- checks replacement rules for eligible codes and makes proper replacements
*
*
  select interact
  select process
  go top DO WHILE .NOT. EOF() .and. code_date=temp_date
    NUMCODE = 0
    TEMP = CODE
    PROC_REC = RECNO()
    SELECT INTERACT
    SEEK str(TEMP,5) + 'R2'
    IF eof()
      SELECT PROCESS
```

```
        GO PROC_REC
          skip
          loop
      ENDIF
      REP_REC = RECNO()

SELECT PROCESS
        GO TOP
        DO WHILE .not. eof() .and. code_date=temp_date
          SELECT INTERACT
          GO REP_REC
          DO WHILE ACODE=TEMP .AND. rule = 'R2' .and. .NOT. EOF()
            IF BCODE = process->code
              NEW = CCODE
              SELECT PROCESS
              REPLACE ENDSTATUS WITH "R", TRIGGER WITH TEMP;
                REPLACEDBY WITH NEW, RULE WITH "R2", type with interact->code
              temp_rec = recno()
              temp_code = code
              ses_no = session_no
              GO PROC_REC
              REPLACE ENDSTATUS WITH "R", TRIGGER WITH temp_code;
                REPLACEDBY WITH NEW, RULE WITH "R2", type with interact->code
              rep_date=code_date
              append blank
                REPLACE SESSION_NO WITH ses_no, CODE WITH NEW;
                           WITH                      code
                  BEGSTATUS WITH "R", ENDSTATUS WITH "A", code_date with rep_date
                  STORE .F. TO AGAIN
                go temp_rec
                EXIT
            ENDIF
            select interact
            SKIP
          ENDDO
          select process
          skip
        ENDDO
        SELECT PROCESS
        GO PROC_REC
        SKIP
      ENDDO
      if .not. again
        store .t. to again
      else
        store .f. to again
      endif
      select process
      return PROCEDURE query

*----   checks codes for QM,QS,QB rules and makes appropriate changes
*
*

**select interact
**set filter to rule ='QM'       && looking only at codes which have multiple
                                 && code queries
select process
go top do while .not. eof() .and. code_date=temp_date         && in process
  temp = code
  proc_rec = recno()
  select interact
  seek str(temp,5) + 'Q'
  if eof()
    select process
    go proc_rec
    skip
    loop
  endif
  quer_rec = recno()
  select process
  go top
  do while .not. eof() .and. code_date=temp_date       && in process
```

```
        if code = temp
          skip
          loop
        endif
        done=.f.
        select interact
        go quer_rec
        do while acode = temp .and. substr(rule,1,1) = 'Q' .and. .not. eof()
          if process->code >= bcode .and. process->code <= ccode
            do case case rule='QM'
                replace process->endstatus with 'M', process->trigger with temp, ;
                  process->rule with rule, process->type with ecode
                temp2 = process->code
                select process
                go proc_rec
                replace endstatus with 'M', trigger with temp2, ;
                  rule with interact->rule, type with interact->ecode
                done=.t.

case rule='QS'
                temp2=process->code
                select process
                go proc_rec
                replace endstatus with 'Q', trigger with temp2, ;
                  rule with interact->rule, type with interact->ecode
                done=.t.

case rule='QE'
                replace process->endstatus with 'Q', process->trigger with temp, ;
                  process->rule with rule, process->type with ecode
                done=.t.

endcase
            if done
              exit
            endif
          endif
          select interact
          skip
        enddo
        if done
          exit
        endif
        select process
        skip
      enddo
      select process
      go proc_rec
      skip
    enddo
    **select process
    **select interact
    return PROCEDURE r1s

*---- Checks surviving codes for R1 rules and makes proper replacement
    *
    * select interact
    **set filter to rule = 'R1' select process
    go top do while .not. eof() .and. code_date=temp_date      && in process
      temp=code
      proc_rec = recno()
      select interact
      go top
      seek str(temp,5) + 'R1'
```

```
      if eof()
         select process
         go proc_rec
         skip
         loop
      endif
      R1_rec = recno()
      select process
      go top
      select interact
      go R1_rec
      do while acode=temp .and. .not. eof() .and. rule='R1'       && in interact
         select process
         if code=temp
            skip
            select interact
            loop
         endif
         if interact->bcode<=code .and. code<=interact->ccode
            go proc_rec
            replace endstatus with '1', trigger with code;
            replacedby with interact->dcode, type with interact->ecode
            tem_date=code_date
            append blank
            replace code with interact->dcode, begstatus with '1';
            endstatus with 'A', code_date with tem_date, type with interact->ecode
            store .f. to again
            exit
         endif
         select interact
         skip
      enddo
      select process
      count to code_cnt for endstatus $ 'AP' .and. code_date=temp_date
      go top
      if code_cnt <= 1
         exit
      endif
      go proc_rec
      skip
enddo
return PROCEDURE samecode
*
*
*   eliminates a code if it appears twice, and should not be accepted twice
* select process
set filter to endstatus $ 'AP' .and. code_date=temp_date
go top
first=code
do while .not. eof() .and. code_date=temp_date
  xcode=code
  proc_rec=recno()
  skip
  do while .not. eof() .and. code_date=temp_date
    if code=xcode
       replace endstatus with 'L', trigger with xcode
       exit
    else
       skip
       loop
    endif
  enddo
  go proc_rec
  skip
  if code=first
     exit
  endif
enddo
select process
go top
code_cnt=0
count to code_cnt for endstatus $ 'AP' .and. code_date=temp_date
return PROCEDURE limit_pay
```

```
* --- checks rules for payment limit due to code combination
*
*
  select 10
  use interact index interact
  select process
  set filter to endstatus $ 'AP' .and. code_date=temp_date
  GO TOP
  do while .not. eof() .and. code_date=temp_date
      NUMCODE = 0
      TEMP = CODE
      PROC_REC = RECNO()
      SELECT INTERACT
      SEEK str(TEMP,5) + 'L'
      IF .NOT. FOUND()
         SELECT PROCESS
         GO PROC_REC
         SKIP
         LOOP
      ENDIF
      lim_rec = RECNO()

select process
      go top
      do while .not. eof() .and. code_date=temp_date       && in process
         if code = temp
            skip
            loop
         endif
         SELECT interact
         GO lim_rec
         DO WHILE acode=temp .AND. rule = 'L1' .and. .NOT. EOF()
            IF BCODE <= process->code .AND. process->code <= CCODE
               SELECT PROCESS
               temp1=code
               temp_rec= recno()
               go proc_rec
               REPLACE ENDSTATUS WITH "U", TRIGGER WITH TEMP1, RULE WITH "L1" ;
                   pay with interact->dcode
               go temp_rec
               EXIT
            ENDIF
            select interact
            SKIP
         ENDDO                                              && in interact
         select process
         skip
      ENDDO                                                 && Loop 2, in process
      SELECT PROCESS
      GO PROC_REC                                           && Moving to next code for evaluation
      SKIP
  enddo
SELECT INTERACT
use

**SET FILTER TO
RETURN

* RULES.PRG select 5
use byitself index byitself set procedure to prompts
need_clear = .f.
new_age = 200
cur_row = 0
leftover = 0
code_text = ' '
cmess = ' '
prompt_ans = ' '
prompt_row = 16
                              && check this with multiple codes !!
select process
set filter to endstatus $ 'AP' .and. code_date=temp_date .and. begstatus <> 'R'
count to code_cnt for endstatus $ 'AP' .and. code_date=temp_date .and. ;
    begstatus <> 'R'
go top
```

```
IF CLIPPER
     SAVE SCREEN to rule_scrn
ENDIF

DO WHILE .NOT. EOF() .and. code_date=temp_date
  xcode = code
  xreview = ' '
  xsource = ' '
  failed = .f.
  note = .f.
  select byitself
  seek xcode
  if eof()
      SELECT PROCESS
      SKIP
      LOOP
  endif
  IF SINGLE
    IF CODE_CNT > 1
       select process
       skip
       LOOP
    ENDIF
  ENDIF
  rulecheck = byitself->rule
    do case
      case rulecheck = 'Q1'
         select process
         replace endstatus with 'Q', rule with 'Q1',type with ;
               byitself->mesagetype
**    case rule = 'Q2' case rulecheck = 'Q3'
         dlim = '$'+ltrim(str(dollarlim,6))
         dline1 = substr('Under '+ dlim + space(25),1,29)
         dline2 = substr(dlim + ' or more' + space(25),1,29)
         dline3 = 'No charge is listed for ' + str(xcode,5)
         do ctext with xcode
         if need_clear
             do bott_clr
         endif
         dc dollars
                         and=
***         if prompt_ar    '1' ....
      case rulecheck = 'Q4'
         do ctext with xcode
         xmess = cmess
         do ctext with BYITSELF->codelim
         if need_clear
             do bott_clr
         endif
         do codelim case rulecheck = 'Q5'
         if process->begstatus = 'P'
             do ctext with xcode
         else
             cmess = 'the claim'
         endif
         if need_clear
             do bott_clr
         endif
         do pos case rulecheck = 'Q6'
         do ctext with xcode
         if need_clear
             do bott_clr
         endif
         do anesth case rulecheck = 'Q7'
         if need_clear
             do bott_clr
         endif
         do age
```

```
      case rulecheck = 'Q8'
          if need_clear
              do bott_clr
          endif
          do diagnosis case rulecheck = "Q9"
        if need_clear
            do bott_clr
        endif
        select process
        replace endstatus with 'D', rule with 'Q9', type with byitself->mesagetype ;
            replacedby with byitself->codelim
        append blank
        replace code with byitself->codelim, begstatus with 'D', endstatus with 'A';
            type with byitself->mesagetype endcase
      SELECT PROCESS
      SKIP
ENDDO
**select process
**set filter to select byitself
use
if need_clear
    do bott_clr
endif
release rule_scrn
select process
count to code_count
if code_count > 1
    set procedure to action
    do limit_pay
    set procedure to
endif
return
*** prompts.prg
*
* POS_BOX
* POS
* DOLLARS
* AGE
* ANESTH PROCEDURE POS_BOX
PARAMETERS BOX_ROW,BOX_COL
xpos = ' '

@ box_row+1,box_col+1 clear to box_row + 6, box_col + 52
@ box_row,box_col to box_row + 7, box_col + 53
@ box_row-1,box_col + 17 to box_row + 1, box_col + 36
@ box_row, box_col + 18 say ' PLACE OF SERVICE '
if clipper
    @ box_row + 2, box_col + 4 prompt dline1
    @ box_row + 3, box_col + 4 prompt dline2
    @ box_row + 4, box_col + 4 prompt dline3
    @ box_row + 5, box_col + 4 prompt dline4
    @ box_row + 6, box_col + 4 prompt dline5
else
    @ box_row + 2, box_col + 3 say '1. ' + dline1
    @ box_row + 3, box_col + 3 say '2. ' + dline2
    @ box_row + 4, box_col + 3 say '3. ' + dline3
    @ box_row + 5, box_col + 3 say '4. ' + dline4
    @ box_row + 6, box_col + 3 say '5. ' + dline5
endif
RETURN PROCEDURE DIA_BOX
PARAMETERS BOX_ROW,BOX_COL
xpos = ' '

@ box_row+1,box_col clear to box_row + 6, box_col + 53
@ box_row,box_col+1 to box_row + 7, box_col + 54
@ box_row-1,box_col + 16 to box_row + 1, box_col + 37
@ box_row,box_col + 17 say ' DIAGNOSIS/PROVIDER '
```

```
if clipper
    @ box_row + 2, box_col + 4 prompt dline1
    @ box_row + 3, box_col + 4 prompt dline2
    @ box_row + 4, box_col + 4 prompt dline3
    @ box_row + 5, box_col + 4 prompt dline4
else
    @ box_row + 2, box_col + 3 say '1. ' + dline1
    @ box_row + 3, box_col + 3 say '2. ' + dline2
    @ box_row + 4, box_col + 3 say '3. ' + dline3
    @ box_row + 5, box_col + 3 say '4. ' + dline4
endif
RETURN PROCEDURE REC_BOX
PARAMETERS row_beg,col_beg,col_end
string = trim(message->tolookfor)
str_size = len(string)
max_size = col_end-(col_beg+6)-1
box2 = int((max_size-30)/2)
rows = int(str_size/(max_size-6))+1
** The "max" function forces top of box to row 1 if box is off screen
IF ROW_BEG < 0
    row_beg = max(2,(ROW_BEG * (-1)) - ROWS - 6)
ENDIF
cur_row = row_beg + 5

@ row_beg,col_beg-2 clear to row_beg + rows+4, col_end-1
@ row_beg-1,col_beg-3 to row_beg + rows+5,col_end
@ row_beg-2,col_beg+box2+5 to row_beg, col_beg +box2+34
@ row_beg-1,col_beg+box2+6 say ' CodeReview Recommendation ' do while str_size > max_size
        counter = 0
        do while .t.
            if substr(string,max_size-counter+1,1) = ' '
                exit
            else
                counter = counter + 1
            endif
        enddo
        @ cur_row,col_beg+6 say substr(string,1,max_size - counter)
        cur_row = cur_row + 1
        str_size = str_size - max_size + counter - 1
        string = substr(string,max_size - counter + 2,str_size)
    enddo @ cur_row,col_beg+6 say string
    @ row_beg + 1, col_beg say dline1
    @ row_beg + 2, col_beg say dline2
    @ row_beg + 3, col_beg say dline3
    @ row_beg + 4, col_beg say dline4
    @ row_beg + 5, col_beg say dline5
RETURN PROCEDURE DOL_BOX
PARAMETERS BOX_ROW,BOX_COL
xpos = ' '

@ box_row+1,box_col+1 clear to box_row + 4, box_col + 35
@ box_row,box_col to box_row + 5, box_col + 36
@ box_row-1,box_col + 10 to box_row + 1, box_col + 26
@ box_row, box_col + 11 say ' CODE CHARGE '
if clipper
    @ box_row + 2, box_col + 4 prompt dline1
    @ box_row + 3, box_col + 4 prompt dline2
    @ box_row + 4, box_col + 4 prompt dline3
else
    @ box_row + 2, box_col + 3 say '1. ' + dline1
    @ box_row + 3, box_col + 3 say '2. ' + dline2
    @ box_row + 4, box_col + 3 say '3. ' + dline3
endif
RETURN PROCEDURE CL_BOX
PARAMETERS BOX_ROW,BOX_COL
xpos = ' '
@ box_row+1,box_col+1 clear to box_row + 4, box_col + 72
@ box_row,box_col to box_row + 5, box_col + 73
```

```
@ box_row-1,box_col + 25 to box_row + 1, box_col + 47
@ box_row,   box_col + 26 say '  CHARGE COMPARISON  '
if clipper
    @ box_row + 2, box_col + 3 prompt '1. ' + dline1
    @ box_row + 3, box_col + 3 prompt '2. '+ dline2
    @ box_row + 4, box_col + 3 prompt '3. '+ dline3
else
    @ box_row + 2, box_col + 3 say '1. ' + dline1
    @ box_row + 3, box_col + 3 say '2. ' + dline2
    @ box_row + 4, box_col + 3 say '3. ' + dline3
endif
return PROCEDURE DIAGNOSIS
*
do helpline
mode = 0
need_clear = .t.
prompt_row=16
prompt_col=10
promptline = 'Which of the following information appears on the claim?'
do format2.prg with promptline,prompt_row-5,prompt_col,70
dline1 = (byitself->dx)+space(24)
dline2 = 'ICD9 code(s):   '+(byitself->ICD9code)+space(9)
dline3 = 'Provider = podiatrist, DPM, or foot doctor/group'
dline4 = 'None of the above
do dia_box with prompt_row-2,14
do while .t.
    if clipper
        menu to mode
        prompt_ans = str(mode,1)
    else
        prompt_ans = ' '
        @ cur_row,(prompt_col+leftover+2) get prompt_ans picture '9'
        read
        If .not. prompt_ans $ '1234'
            mess = 'ENTER 1,2,3,or 4'
            DO MESSAGE.PRG
            loop
        endif
    endif
    exit
enddo
if prompt_ans $ '123'
    failed = .t.
    select process
    replace endstatus with 'D',rule with 'Q8',type with byitself->mesagetype ;
        replacedby with byitself->codelim
    tem_date=code_date
    append blank
    replace code with byitself->codelim,begstatus with 'D',endstatus with 'A';
        type with byitself->mesagetype, code_date with tem_date
    set filter to endstatus $ 'AP' .and. code_date=temp_date
    go top
endif
return PROCEDURE POS
*
do helpline
mode = 0
need_clear = .t.
prompt_row = 16
prompt_col = 6
promptline =  'Enter the place of service for ' + cmess + ': '
do format2.prg with promptline,prompt_row - 5,prompt_col,70
dline1 = 'Inpatient Hospital
dline2 = 'Outpatient Hosp./Emergency Dept./Surg. Center '
dline3 = 'Office
dline4 = 'Place of service other than those listed above'
dline5 = 'Place of service is not provided on the claim '
do pos_box with prompt_row -2,14
do while .t.
    if clipper
        menu to mode
        prompt_ans = str(mode,1)
    else
        prompt_ans = ' '
```

```
                    @ cur_row,(prompt_col+leftover+2) get prompt_ans picture '9'
                    read
                    If .not. prompt_ans $ '12345'
                         mess = 'ENTER 1,2,3,4 or 5'
                         DO MESSAGE.PRG
                         loop
                    endif
               endif
               exit
          enddo
            select process
             do case
                case prompt_ans = '1'
                     replace POS with 'INP'
                case prompt_ans = '2'
                     replace POS with 'OUT'
                case prompt_ans = '3'
                     replace POS with 'OFF'
                case prompt_ans = '4'
                     replace POS with 'OTH'
                case prompt_ans = '5'
                     replace POS with 'NUL'
             endcase do case
              case byitself->pos = 'OFF'
                   if prompt_ans $ '345'
                        failed = .t.
                   endif case byitself->pos = 'INP'
                   if prompt_ans $ '145'
                        failed = .t.
                   endif case byitself->pos = 'OUT'
                   if prompt_ans $ '245'
                        failed = .t.
                   endif case byitself->pos =   'NIP'
                   if prompt_ans $ '2345'
                        failed = .t.
                   endif
         endcase
         if failed
              if byitself->codelim = 0
                   select process
                   replace endstatus with 'Q',rule with 'Q5',type with ;
                         byitself->mesagetype
              else
                   select process
                   replace endstatus with 'C',rule with 'Q5',replacedby with ;
                         byitself->codelim,type with byitself->mesagetype
                   tem_date=code_date
                   append blank
                   replace code with byitself->codelim,begstatus with 'O',endstatus ;
                         with 'A',type with byitself->mesagetype, code_date with tem_date
                   set filter to endstatus $ 'AP' .and. code_date=temp_date
              endif
         endif
         return PROCEDURE DOLLARS
*
do helpline
mode = 0
need_clear = .t.
prompt_row = 16
prompt_col = 8
promptline = 'Enter the appropriate Code Charge as it appears on the claim ';
         + 'for the procedure ' + cmess + ': '
do format2.prg with promptline,prompt_row - 5,prompt_col,70
do dcl_box with prompt_row,21
do while .t.
     if clipper
          menu to mode
          prompt_ans = str(mode,1)
```

```
            else
                prompt_ans = ' '
                @ cur_row,(prompt_col+leftover+2) get prompt_ans picture '9'
                read
                If .not. prompt_ans $ '123'
                    mess = 'ENTER 1,2,OR 3'
                    DO MESSAGE.PRG
                    loop
                endif
            endif
        exit
enddo
if prompt_ans $ '23'
    failed = .t.
    select process
    replace endstatus with 'Q',rule with 'Q3',type with byitself->mesagetype
endif
return PROCEDURE CODELIM
*
do helpline
mode = 0
need_clear = .t.
prompt_row = 16
prompt_col = 6
promptline = 'Please compare the charge on the claim for procedure ';
            + xmess + ' with the payment limit for procedure ';
            + cmess + ': '
dline1 = 'Charge for '+str(xcode,5) + ' is GREATER THAN payment limit ';
         + 'for ' + str(byitself->codelim,5) + space(8)

dline2 = 'Charge for '+str(xcode,5) + ' is LESS THAN OR EQUAL TO payment ';
         +'limit for ' + str(byitself->codelim,5)

dline3 = 'No charge is listed on the claim for ' + str(xcode,5) +space(20)
do format2.prg with promptline,prompt_row - 6,prompt_col,70
do cl_box with prompt_row,4
do while .t.
    if clipper
        menu to mode
        prompt_ans = str(mode,1)
    else
        prompt_ans = ' '
        @ cur_row,(prompt_col+leftover+2) get prompt_ans picture '9'
        read
        If .not. prompt_ans $ '123'
            mess = 'ENTER 1,2,OR 3'
            DO MESSAGE.PRG
            loop
        endif
    endif
    exit
enddo
if prompt_ans $ '13'
    failed = .t.
    select process
    replace endstatus with 'Q',rule with 'Q4',type with byitself->mesagetype
endif
return PROCEDURE AGE
*
age = ' '
if new_age = 200
    do helpline
    need_clear = .t.
    prompt_row = 18
    prompt_col = 10
    @ prompt_row,8 say ;
        "Enter the patient's date of birth or age, whichever is easier: "
    @ prompt_row + 2,15 say 'Date of Birth'
    @ prompt_row + 2,40 say 'Age'
    set date american
    do while .t.
        age = ' '
        dob = ctod(' / / ')
        @ prompt_row + 2,29 get dob
        read
```

```
            if dob = ctod('  /  /  ')
                @ prompt_row + 2,29 say space(8)
                @ prompt_row + 2,44 get age
                read
                if age = '  '
                    @ prompt_row + 2,44 say space(3)
                    loop
                endif
            endif
            exit
        enddo
        if age <> '  '
            new_age = val(age)
        else
            new_age = int((date()-dob)/365)
        endif
    endif
    if new_age >= byitself->begage .and. new_age <= byitself->endage
        failed = .t.
        select process
        replace endstatus with 'Q',rule with 'Q7',type with byitself->mesagetype
    endif
    set date ansi
    return PROCEDURE ANESTH
    *
    do helpline
    need_clear = .t.
    prompt_row = 16
    prompt_col = 8
    promptline = 'For the procedure ' + cmess + ',is there a claim (from a ';
        + 'surgeon, an anesthesiologist, or a facility) that documents ';
        + 'the use of regional or general anesthesia ? (Y/N) '
    do format2.prg with promptline,prompt_row,prompt_col,72
    do while .t.
        prompt_ans = ' '
        @ cur_row,(prompt_col+leftover+2) get prompt_ans picture '!'
        read
        If .not. prompt_ans $ 'YN'
            ?? chr(7)
            loop
        endif
        exit
    enddo
    if prompt_ans = 'N'
        failed = .t.
        select process
        replace endstatus with 'Q',rule with 'Q6',type with byitself->mesagetype
    endif
    return procedure ctext
    *
    Parameter zcode
    select allcode
    seek zcode
    cmess = str(zcode,5) + ' (' + trim(title4) + ')'
    return procedure review
    *
    parameter abbrev
    do case
        case abbrev = 'RN'
            xreview = 'a nurse or surgical technician'
        case abbrev = 'MD'
            xreview = 'a physician'
        case abbrev = 'SP'
            xreview = 'a supervisor'
        case abbrev = 'AD'
            xreview = 'an adjuster'
        case abbrev = 'CL'
            store .t. to note
    endcase
    return procedure source
    *
```

```
* NOTE: message.dbf is selected
do case
    case op
        xsource = 'the operative report reviewed'
    case path
        xsource = 'the pathology report reviewed'
    case off
        xsource = 'the office records reviewed'
    case hos
        xsource = 'the hospital progress report reviewed'
    case other
        xsource = 'other related claim(s) reviewed'
    otherwise
        xsource = 'the claim reviewed'
endcase
return procedure helpline
*
@ 1,1 get header
helpline = space(78)
@ 23,1 get helpline
clear gets
return procedure bott_clr
*
If CLIPPER
    RESTORE SCREEN from rule_scrn
else
    @ 16,1 clear to 22,78
ENDIF
need_clear = .f.
return

*****recomm.prg
*******CREATE NEW.DBF
select 6
use message index message
select process
set index to
SET FILTER TO ENDSTATUS $ 'PAQMU'            && ACCEPTED CODES ONLY
SET RELATION TO REPLACEDBY INTO ALLCODE      && TO GET TITLE4
GO TOP
REPLACE ALL RVU WITH ALLCODE->RVU
xcount = 0
count to xcount
SET SAFETY OFF
if xcount > 1
    SORT TO NEW ON RVU/D
else
    copy to new
endif                    && SORT IN RVU ORDER (DESCENDING ORDER)
SET SAFETY ON
SET FILTER TO
SET RELATION TO
GO TOP

** ENTRY.PRG
SET PROCEDURE TO lines
***RELEASE ALL
**SET UP SCREEN

SELECT 10
use new
** MEMORY VARIABLES inv_mess= 'INVALID:  This invalid code has been ignored by CodeReview.'
sup_mess= 'SUPERSEDED:  This code has been replaced by an updated CPT-4 code.'
acc_mess= 'ACCEPTED:  This code has been accepted with no change.'
rep_mess= 'REPLACED:  In combination, these codes justify replacement by '
exc_mess= 'EXCLUDED:  This code is a part of '
o_mess  = 'QUESTIONABLE:  Press <F7> for further information.'
query_mess= 'QUESTIONABLE:  This combination is unlikely. Press <F7> for further ';
    + space(5) + chr(179) + space(21)+ 'information.'
lap_mess= 'EXCLUDED:  This procedure is incidental to the accepted code(s).'
o_mess =    'REPLACED:  This code has been replaced by the code below. Press <F7>';
    +space(5) + chr(179) + space (21)+ 'for further information.'
r_mess =   'REPLACED:  This code has been replaced by the code below.'
```

```
lys_mess='EXCLUDED:  This procedure is incidental to the accepted code(s), but';
+space (23)+ 'if the diagnosis is infertility/sterility, accept it.'
app_mess='EXCLUDED:  When performed with another abdominal procedure,          ';
+'                         appendectomy is virtually always incidental.'
an_mess='EXCLUDED:  64450 is inappropriate to use for local anesthesia.'
l_mess= 'EXCLUDED: because this code can not be accepted twice.'
lim_mess='LIMIT PAYMENT: of this code to $ ' store 0 to clear_rec1,clear_rec2,clear_rec3,clear_rec4,clear_rec5,clear_rec6,;
          clear_rec7,clear_rec8
store 0 to clear_row1,clear_row2,clear_row3,clear_row4,clear_row5,clear_row6,;
          clear_row7,clear_row8
clear_cnt = 0
choice = 'S'
repeat = .f.
moreinfo = .f.
store ' ' to rec_scrn1
store ' ' to rec_scrn2
help_on = .f.
row = 6
counter = 1
done = .f.
new2 = ' '
add = .t.
box = .f.
helpline = helpline3
SELECT PROCESS
go top
if claim_amt > 0
    say_amt = .t.
**    say_amt = .f.
else
    say_amt = .f.
endif
set filter to begstatus = 'P'
SET RELATION TO CODE INTO ALLCODE
go top
counter = 1
row = counter + 5
set relation to
select new
set relation to code into allcode
go top
mess_row = 14
outrow = 17
counter = 1
do while .not. eof() .and. code <> 0
    if endstatus $ 'QM'
      @outrow,s_col-4 say '??'
    endif
    set date american
    @ outrow,s_col say str(counter,2) + '. '
    @ outrow,e_col SAY STR(code,5)
    @ outrow,d_col say allcode->title4
    if code_date <> ctod(' / / ')
        @ outrow,c_col say code_date
    endif
    if say_amt
        if counter = 1 .and. allcode->pay<>' BR '
            @ outrow,m_col-1 say '$'
        endif
        @ outrow,m_col  say allcode->pay
    endif
    counter = counter + 1
    outrow = outrow + 1
    skip
enddo
select new
set relation to
go top
select process
go top
row = 6
outrow = 17
first_time = .t.
@ 14,s_col say 'RECOMMENDATION'
@ 15,s_col to 15,s_col + 13
@ 23,1 get helpline
```

```
      clear gets
      IF CLIPPER
          save screen to rec_scrn1
      ENDIF
      select process
      set filter to begstatus $ 'P'
      go top do while .t.
          clear_cnt = 0
          @ 23,1 get helpline
          clear gets
          if clipper
              if repeat
                  moreinfo = .f.
                  first_time = .t.
                  repeat = .f.
                  restore screen from rec_scrn1
              endif
              temp = ' '
              keyboard chr(12)
              do while .t.
                      keyboard chr(12)
                      @ 23,78 get temp
                      read
                      do case
                      case lastkey() = 27
                              done = .t.
                              exit case lastkey() = 13
                          if moreinfo
                              restore screen from rec_scrn2
                              moreinfo = .f.
**                              set key -6 to moreinfo
                          endif
                          EXIT endcase
              enddo
              keyboard chr(12)
          else
              choice = 'X'
              do while .t.
                  SET CONFIRM OFF
                  @ 23,10 get choice picture '!'
                  read
                  SET CONFIRM ON
                  if .not. choice $ 'XNQ'
                      ?? chr(7)
                      loop
                  else
                      exit
                  endif
              enddo
              if choice $ 'NQ'
                  done = .t.
              endif
          endif
          if done
              exit
          endif
******

*@ 15,s_col to 15,s_col + 13

@ 14,s_col say '                              '
      @ 15,s_col say '                              '
      select process
      if .not. first_time
              @ row,s_col - 6 clear to outrow,s_col - 1    && moved from below
              @ mess_row,6 clear to mess_row+1,78           && moved from below
              @ row,s_col say str(row-5,2) + '.   ' + str(code,5)
              select new
              @ outrow,s_col say str(recno(),2) + '.   ' + str(code,5)
                                    'MQ'
                  if endstatus $ 'W'
                      @outrow,s_col+4 say '??'
                      if '.' $ new2
```

```
                    outrow = new2_row          && for clearing arrows
                    @ outrow,s_col-4 say '??'
                    @ new2_row,s_col say new2
                    new2 = ' '
                endif
            endif
**          @ row,s_col - 6 clear to outrow,s_col - 1
**          @ mess_row,6 clear to mess_row+1,78
            select process
            save_place = recno()
            counter = 1
            K = '1'
            do while clear_rec&K <> 0
                go clear_rec&K
                @ clear_row&K,s_col say str(clear_row&K-5,2)+'.  '+str(code,5)
                clear_rec&K = 0
                counter = counter + 1
                K = str(counter,1)
            enddo
            go save_place
            skip
            if eof()
                repeat = .t.
                row = 6
                go top
                loop
            else
                row = row + 1
            endif
            do while skipover
                skip
                if eof()
                    repeat = .t.
                    row = 6
                    go top
                else
                    row = row + 1
                endif
            enddo
            if repeat
                loop
            endif
        else
            first_time = .f.
*           if xcount = 1
*               repeat = .t.
*               loop
*           endif
        endif
        temp1 = str(row-5,2) + '.  ' + str(code,5)
        do case
            case endstatus = 'I'
                @ row,s_col get temp1
                do first_in with row
                if row+1 = mess_row -1
                    @ row+1,1_col say chr(179)
                else
                    @ row+1,1_col to mess_row-1,1_col
                endif
                do mid_out with mess_row
                @ mess_row,g_col say inv_mess case begstatus = 'P' .and. endstatus $ 'PU'
                SELECT NEW
                locate for code = PROCESS->code
                outrow = 17 + recno() - 1
                temp2 = str(recno(),2) + '.  ' + str(code,5)
                @ row,s_col get temp1
                clear gets
                do first_in with row
                @ row+1,1_col to outrow-1,1_col
                do last_out with outrow
                @ outrow,s_col get temp2
                clear gets
                if endstatus = 'P'
                    @ mess_row,g_col say acc_mess
                else
                    if endstatus = 'U'
                        @ mess_row,g_col-2 say lim_mess + ltrim(str(pay,4))+  ;
                        ', since it appears with '+ str(trigger,5) + '.'
```

```
        endif
    endif case begstatus = 'P' .and. endstatus $ 'ISOD'
    SELECT NEW
    locate for code = PROCESS->replacedby
    xtype = type
    outrow = 17 + recno() - 1
    temp2 = str(recno(),2) + '. ' + str(code,5)
    @ row,s_col get temp1
    clear gets
    do first_in with row
    @ row+1,l_col to outrow-1,l_col
    do last_out with outrow
    @ outrow,s_col get temp2
    clear gets
    do case case endstatus='S' .or. (endstatus='A' .and. begstatus = 'S')
            mess = sup_mess
            @ mess_row,g_col say mess case (endstatus='1' .or. (endstatus='A' .and. begstatus='1')) ;
            .and. xtype = 0
            mess = r_mess
            @ mess_row,g_col say mess case (endstatus='1' .or. (endstatus='A' .and. begstatus='1')) ;
            .and. xtype<>0
            select message
            seek xtype
            @ mess_row,g_col say 'REPLACED:  '+ TRIM(tolookfor)
            @ row+1,l_col to outrow-1,l_col otherwise
            do moreinfo endcase case begstatus = 'P' .and. endstatus = 'R'
    SELECT NEW
    locate for code = PROCESS->replacedby
    outrow = 17 + recno() - 1
    temp2 = str(recno(),2) + '. ' + str(code,5)
    @ row,s_col get temp1
    if process->type <> 0
        box = .t.
        xtype = process->type
    endif
    clear gets
    do first_in with row
    SELECT PROCESS
    cur_rec = recno()
    cur_row = row
    match = replacedby
    skip
    cur_row = row + 1
    do while .not. eof()
        if replacedby = match
            temp3=str(cur_row-5,2) + '. ' + str(code,5)
            clear_cnt = clear_cnt + 1
            K = str(clear_cnt,1)
            clear_row&K = cur_row
            clear_rec&K = recno()
            @ cur_row,s_col get temp3
            replace skipover with .t.
            clear gets
            do mid_in with cur_row
        else
            @ cur_row,l_col say chr(179)
        endif
        skip
        cur_row = cur_row + 1
    enddo
    go cur_rec
    if box
        do moreinfo
        @ cur_row,l_col to outrow-1,l_col
```

```
         else
             @ mess_row,g_col say rep_mess + str(replacedby,5)+'.'
             @ cur_row,1_col to outrow-1,1_col
         endif
         do last_out with outrow
         @ outrow,s_col get temp2
         if box
             dc moreinfo
         endif
         box = .f.
         clear gets case begstatus = 'P' .and. endstatus = 'E'
         @ row,s_col get temp1
         do first_in with row
         if row+1 = mess_row -1
             @ row+1,1_col say chr(179)
         else
             @ row+1,1_col to mess_row-1,1_col
         endif
         do mid_out with mess_row
         do case
             case code=44950 .or. code=44955
                  @ mess_row,g_col say app_mess otherwise
                save_spot = recno()
                xtrigger = trigger
                if type <> 0
                   box = .t.
                endif
                xtype = type
                go top
                locate for code = xtrigger
                do case
                    case endstatus = 'E'
                          xtrigger = trigger
                    case endstatus = 'R'
                          xtrigger = replacedby
                endcase
                go save_spot
                if box .and. xtype <> 49001
                   select message
                   seek xtype
                   @ mess_row,g_col say 'EXCLUDED:  '+ TRIM(tolookfor)
                else
                   if xtype = 49001
                      select message
                      seek xtype
                      @ mess_row,g_col say 'EXCLUDED:  ' +trim(tolookfor) ;
                         + '  ' +str(xtrigger,5)+'.'
                   else
                      @ mess_row,g_col say exc_mess+str(xtrigger,5)+'.'
                   endif
                endif
                box = .f.
         endcase case begstatus = 'P' .and. endstatus = 'M'
         match = trigger
         SELECT NEW
         locate for (code=PROCESS->code) .or. code = match
         outrow = 17 + recno() - 1
         temp2 = str(recno(),2) + '.  ' + str(code,5)
         @ row, s_col get temp1
         do first_in with row
         SELECT PROCESS
         cur_rec = recno()
         cur_row = row
         match = trigger
         skip
         cur_row = row + 1
         dc while .not. eof()
             if code = match
                temp3 = str(cur_row-5,2) + '.  ' + str(code,5)
                clear_cnt = clear_cnt + 1
                K = str(clear_cnt,1)
```

```
            clear_row&K = cur_row
            clear_rec&K = recno()
            @ cur_row,s_col get temp3
            replace skipover with .t.
            clear gets
            do mid_in with cur_row
        else
            @ cur_row,1_col say chr(179)
        endif
        skip
        cur_row = cur_row + 1
    enddo
    @ cur_row,1_col to outrow-1,1_col
    go cur_rec
    do ques_M1 with outrow
    @ outrow,s_col get temp2
    cur_row = outrow + 1
    clear gets
    select new
    sav_newrec = recno()
    skip
    do while .not. eof()
        if code = match .or. code = process->code
            new2 = str(recno(),2) + '.  ' + str(code,5)
            new2_row = cur_row
            @ cur_row,s_col get new2
            clear gets
            do ques_out with cur_row
            exit       && limited to 2 codes
        else
            @ cur_row,1_col say chr(179)      && only if > 2 codes
        endif
        skip
        cur_row = cur_row + 1
    enddo
    go sav_newrec
    @ mess_row,g_col say query_mess
    do moreinfo case begstatus = 'P' .and. endstatus = 'Q'
    SELECT NEW
    locate for code = PROCESS->code
    outrow = 17 + recno() - 1
    temp2 = str(recno(),2) + '.  ' + str(code,5)
    @ row,s_col get temp1
    clear gets
    do first_in with row
    @ row+1,1_col to outrow-1,1_col
    do ques_out with outrow
    @ outrow,s_col get temp2
    clear gets
    @ mess_row,g_col say q_mess
    do moreinfo case begstatus='P' .and. endstatus='L'
    @ row,s_col get temp1
    do first_in with row
    if row+1 = mess_row -1
        @ row+1,1_col say chr(179)
    else
        @ row+1,1_col to mess_row-1,1_col
    endif
    do mid_out with mess_row
    @ mess_row,g_col say l_mess endcase
ENDDO
select 2    && process
use process
**set filter to
**go top
**select 9                    && Adding records to HISTROY.dbf
**use history                 && to keep a log file
**append from process         && commented out, no need for demo
**select 9
**use
**select new
```

```
**use
return

PROCEDURE MOREINFO
*
set key -6 to
set procedure to
**clear gets
moreinfo = .t.
xreview = ' '
cmess = ' '
xsource = ' '
save screen to rec_scrn2
select process
xcode = code
do case
    case endstatus = 'Q' select message
      seek process->type
      xreviewer = reviewer
      note = .f.

do review with xreviewer
      if note
        mess = trim(message->tolookfor)
        set color to &colorh
        do format1.prg with mess,-15,24,78
        set color to &colorm
      else
        do source
        string = ' '
        store 0 to cur_row, col_beg, col_end, row_beg
        dline1 = 'Before accepting code '+str(xcode,5)+':'
        dline2 = ' '
        dline3 = 'HAVE: '+xsource
        dline4 = '  BY: '+xreview
        dline5 = ' WHY: '
        set color to &colorh
        do rec_box with -17,24,78
        set color to &colorm
      endif
      store .f. to note
      set procedure to lines case endstatus = 'M'
       select message
       seek process->type
       xreviewer = reviewer
       note = .f.
       do review with xreviewer
       if note
         mess = trim(message->tolookfor)
         set color to &colorh
         do format1.prg with mess,-15,24,78
         set color to &colorm
       else
         do source
         string = ' '
         store 0 to cur_row, col_beg, col_end, row_beg
         dline1 = 'Before accepting these codes'
         dline2 = ' '
         dline3 = 'HAVE: '+xsource
         dline4 = '  BY: '+xreview
         dline5 = ' WHY: '
         set color to &colorh
         do rec_box with -17,24,78
         set color to &colorm
       endif
       store .f. to note
       set procedure to lines case begstatus $ 'RDOE' .or. endstatus $ 'RDOE'
       select message
       seek process->type
       mess = trim(message->tolookfor)
       set color to &colorh
       do format1.prg with mess,-15,24,78
       set color to &colorm
```

```
            store .f. to note
            set procedure to Line 1.no endcase return

* MESSAGE.PRG
      *
      rmess ='<Enter> '+chr(17)+chr(196)+chr(217)+' to continue '
      rmess= substr(space(17) + rmess + space(40),1,62)
      @ 23,1 say space(78)
      @ 23,9 get rmess
      clear gets
      ?? chr(7)
      do while inkey() <> 13
      enddo
      @ 23,1 say space(78)
      @ 23,1 get helpline
      clear gets
      return
      * format2.prg
      parameters string,row_beg,col_beg,col_end cur_row = row_beg + 1
      string = trim(string)
      str_size = len(string)
      MAX_SIZE = COL_END - COL_BEG - 1
      box2 = int((max_size - 30)/2)
      rows = int(str_size / (max_size-6)) + 1
      do while str_size > max_size
           counter = 0
           do while .t.
                if substr(string,max_size-counter+1,1) = ' '
                     exit
                else
                     counter = counter + 1
                endif
           enddo
           @ cur_row,col_beg say substr(string,1,max_size - counter)
           cur_row = cur_row + 1
           str_size = str_size - max_size + counter - 1
           string = substr(string,max_size - counter + 2,str_size)
      enddo
      @ cur_row,col_beg say string
      leftover = len(string)
      return

* format1.prg
      parameters string,row_beg,col_beg,col_end
      title = ' CodeReview Recommendation '
      string = trim(string)
      str_size = len(string)
      MAX_SIZE = COL_END - COL_BEG - 1
      rows = int(str_size / (max_size-6)) + 1
      box2 = int((max_size - 30)/2)
      ** The "max" function forces top of box to row 1 if box is off screen
      IF ROW_BEG < 0
           row_beg = max(1,(ROW_BEG * (-1)) - ROWS)
      ENDIF
      cur_row = row_beg + 1
      @ row_beg,col_beg-2 clear to row_beg + rows,col_end-1
      @ row_beg-1,col_beg-3 to row_beg + rows + 1, col_end
      @ row_beg-2,col_beg+box2 to row_beg,col_beg+box2+29
      @ row_beg-1,col_beg+box2+1 say title
      do while str_size > max_size
           counter = 0
           do while .t.
                if substr(string,max_size-counter+1,1) = ' '
                     exit
                else
                     counter = counter + 1
                endif
           enddo
           @ cur_row,col_beg say substr(string,1,max_size - counter)
           cur_row = cur_row + 1
           str_size = str_size - max_size + counter - 1
           string = substr(string,max_size - counter + 2,str_size)
      enddo
      @ cur_row,col_beg say string
      return
```

What is claimed is:

1. In a computer system having means for operating on a predetermined database containing medical service codes and a set of relationships among the medical service codes defining whether selected ones of the medical service codes are valid when input with other selected ones of the medical service codes, a method for processing input claims containing at least one medical service code, comprising the steps of:
   receiving at least one claim;
   determining whether any medical service code contained in the at least one claim is not present in the predetermined database; and
   informing a user that a medical service code is not contained in the predetermined database.

2. In a computer system having means for operating on a predetermined database containing medical service codes and a set of relationships among the medical service codes defining whether selected ones of the medical service codes are valid when input with other selected ones of the medical service codes, a method for processing input claims containing at least one medical service code, comprising the steps of:
   receiving at least one claim;
   ascertaining whether the at least one claim contains a plurality of medical service codes;
   determining whether one of the medical service codes in the at least one claim is mutually exclusive due to non-medical criteria with any other medical service code in the at least one claim;
   authorizing medical service codes which are not mutually exclusive due to non-medical criteria with any other medical service codes contained in the at least one claim in response to the determining step; and
   rejecting medical service codes which are mutually exclusive due to non-medical criteria with any other medical service codes contained in the at least one claim in response to the determining step.

3. A computer system including a central processing unit and associated memory for processing input claims containing at least one medical service code, comprising:
   a predetermined database stored in the associated memory, the database containing medical service codes and a set of relationships among the medical service codes defining whether selected ones of the medical service codes are valid when received with other selected ones of the medical service codes;
   means for receiving at least one claim;
   means for ascertaining whether the at least one claim contains a plurality of medical service codes;
   means for determining whether one of the medical service codes in the plurality of medical service codes is valid or invalid by interacting with the database and the set of relationships contained in the database;
   means for authorizing medical service codes which are valid in response to the means for determining; and
   means for rejecting medical service codes which are invalid in response to the means for determining.

4. The apparatus of claim 3, further comprising means for revising the at least one claim to delete invalid medical service codes.

5. The apparatus of claim 4, further comprising means for informing a user why the at least one claim was revised.

6. The apparatus of claim 3, wherein the database containing medical service codes includes medical service codes described by CPT codes.

7. The apparatus of claim 3, wherein the database containing medical service codes includes medical service codes described by CRVS codes.

8. The apparatus of claim 3, further comprising means for requesting further information from a user regarding the at least one claim.

9. The apparatus of claim 3, wherein the relationships among the medical service codes include medically determined relationships.

10. A computer system including a central processing unit and associated memory for processing input claims containing at least one medical service claim, comprising:
    a predetermined database stored in the associated memory, the database containing medical service codes and a set of relationships among the medical service codes defining whether selected ones of the medical service codes are valid when received with other selected ones of the medical service codes;
    means for receiving at least one claim;
    means for ascertaining whether the at least one claim contains a plurality of medical service codes;
    means for determining whether one of the medical service codes in the at least one claim is included in any other medical service code in the at least one claim;
    means for authorizing medical service codes which are not contained in any other medical service code; and
    means for rejecting medical service codes which are contained in any other medical service code.

11. The apparatus of claim 10, further comprising means for revising the at least one claim to not include a rejected medical service code.

12. A computer system including a central processing unit and associated memory for processing input claims containing at least one medical service code, comprising:
    a predetermined database stored in the associated memory, the database containing medical service codes and a set of relationships among the medical service codes defining whether selected ones of the medical service codes are valid when received with other selected ones of the medical service codes;
    means for receiving at least one claim;
    means for ascertaining whether the at least one claim contains a plurality of medical service codes;
    means for determining whether one of the medical service codes in the at least one claim is medically exclusive with any other medical service code in the at least one claim;
    means for authorizing medical service codes which are not medically exclusive with any other medical service codes contained in the at least one claim in response to the means for determining; and
    means for rejecting medical service codes which are medically exclusive with any other medical service codes contained in the at least one claim in response to the determining step.

13. A computer system including a central processing unit and associated memory for processing input claims containing at least one medical service code, comprising:
- a predetermined database stored in the associated memory, the database containing medical service codes and a set of relationships among the medical service codes defining whether selected ones of the medical service codes are valid when received with other selected ones of the medical service codes;
- means for receiving at least one claim;
- means for determining whether any medical service code contained in the at least one claim is not present in the predetermined database; and
- means for informing a user that a medical service code is not contained in the predetermined database.

14. A computer system including a central processing unit and associated memory for processing input claims containing at least one medical service code, comprising:
- a predetermined database stored in the associated memory, the database containing medical service codes and a set of relationships among the medical service codes defining whether selected ones of the medical service codes are valid when received with other selected ones of the medical service codes;
- means for receiving at least one claim;
- means for ascertaining whether the at least one claim contains a plurality of medical service codes;
- means for determining whether one of the medical service codes in the at least one claim is mutually exclusive due to non-medical criteria with any other medical service code in the at least one claim;
- means for authorizing medical service codes which are not mutually exclusive due to non-medical criteria with any other medical service codes contained in the at least one claim in response to the means for determining; and
- means for rejecting medical service codes which are mutually exclusive due to non-medical criteria with any other medical service codes contained in the at least one claim in response to the means for determining.

15. A computer system including a central processing unit and associated memory for processing input claims containing at least one medical service code, comprising:
- a predetermined database stored in the associated memory, the database containing medical service codes and a set of relationships among the medical service codes defining whether selected ones of the medical service codes are valid when received with other selected ones of the medical service codes;
- means for receiving at least one claim;
- means for ascertaining whether the at least one claim contains a plurality of medical service codes;
- means for determining whether one of the medical service codes in the plurality of medical service codes is valid or invalid by interacting with the database and the set of relationships contained in the database;
- means for authorizing the at least one claim in response to the means for determining; and
- means for rejecting the at least one claim in response to the means for determining.

16. In a computer system having means for operating on a predetermined database containing medical service codes and a set of relationships among the medical service codes defining whether selected ones of the medical service codes are valid when input with other selected ones of the medical services codes, a method for processing input claims containing at least one medical service code, comprising the steps of:
- receiving at least one claim;
- ascertaining whether the at least one claim contains a plurality of medical service codes;
- determining whether one of the medical service codes in the plurality of medical service codes is valid or invalid by interacting with the database and the set of relationships contained in the database;
- authorizing the at least one claim in response to the determining step; and
- rejecting the at least one claim in response to the determining step.

* * * * *